(12) United States Patent
Lee et al.

(10) Patent No.: US 10,711,399 B2
(45) Date of Patent: Jul. 14, 2020

(54) BLEACHING AND SHIVE REDUCTION PROCESS FOR NON-WOOD FIBERS

(71) Applicant: Georgia-Pacific Consumer Products LP, Atlanta, GA (US)

(72) Inventors: Jeffrey A. Lee, Neenah, WI (US); Raymond Jeffrey Harwood, Leicestershire (GB); Edward J. Smith, Leicestershire (GB)

(73) Assignee: GPCP IP Holdings LLC, Atlanta, GA (US)

( * ) Notice: Subject to any disclaimer, the term of this patent is extended or adjusted under 35 U.S.C. 154(b) by 541 days.

(21) Appl. No.: 14/716,247

(22) Filed: May 19, 2015

(65) Prior Publication Data

US 2015/0337486 A1  Nov. 26, 2015

Related U.S. Application Data

(60) Provisional application No. 62/000,846, filed on May 20, 2014.

(51) Int. Cl.
| | |
|---|---|
| *D21C 9/10* | (2006.01) |
| *D21C 9/16* | (2006.01) |
| *D21C 1/00* | (2006.01) |
| *D06L 1/12* | (2006.01) |
| *D21H 11/12* | (2006.01) |
| *D21C 5/02* | (2006.01) |
| *D06L 4/18* | (2017.01) |
| *D21H 11/14* | (2006.01) |
| *D06L 4/13* | (2017.01) |
| *D06L 4/12* | (2017.01) |
| *D06L 4/10* | (2017.01) |
| *D01C 1/00* | (2006.01) |

(52) U.S. Cl.
CPC ............... *D21C 9/10* (2013.01); *D01C 1/00* (2013.01); *D06L 1/12* (2013.01); *D06L 4/10* (2017.01); *D06L 4/12* (2017.01); *D06L 4/13* (2017.01); *D06L 4/18* (2017.01); *D21C 5/02* (2013.01); *D21C 9/1068* (2013.01); *D21C 9/1084* (2013.01); *D21C 9/163* (2013.01); *D21H 11/12* (2013.01); *D21H 11/14* (2013.01); *Y02W 30/648* (2015.05); *Y10T 442/60* (2015.04)

(58) Field of Classification Search
CPC ...... D21C 9/10; D21C 9/1068; D21C 9/1084; D21C 9/163; D21C 5/02; D21H 11/12; D21H 11/14; D06L 1/12; D06L 4/12; D06L 4/13; D06L 4/18; D06L 4/10; D01C 1/00; Y10T 442/60; Y02W 30/648
See application file for complete search history.

(56) References Cited

U.S. PATENT DOCUMENTS

| | | | |
|---|---|---|---|
| 797,749 A | 8/1905 | Robinson et al. | |
| 1,868,513 A * | 7/1932 | *Dow ...................... | D06B 5/00 8/157 |
| 1,908,481 A | 5/1933 | Kauffmann | |
| 2,073,682 A * | 3/1937 | Chesley, Jr. ........... | D21C 3/006 162/20 |
| 2,174,178 A * | 9/1939 | Nichols ................... | D06B 5/00 137/505 |
| 2,267,718 A | 12/1941 | Campbell ................. | C10B 5/12 8/139 |
| 2,407,227 A | 11/1943 | Earle | |
| 2,469,249 A * | 5/1949 | Vincent .................... | D06L 4/24 8/108.1 |
| 3,193,445 A * | 7/1965 | Parker ................... | D21C 9/1036 162/76 |
| 3,485,706 A | 12/1969 | Evans | |
| 3,661,699 A | 5/1972 | Edward | |
| 3,775,055 A * | 11/1973 | Wedler ................... | D06B 21/00 8/155.1 |
| 4,014,635 A | 3/1977 | Kroyer | |
| 4,033,811 A | 7/1977 | Gloersen | |
| 4,640,810 A | 2/1987 | Laursen et al. | |
| 4,756,798 A | 7/1988 | Lachenal et al. | |
| 4,795,476 A | 1/1989 | Bean et al. | |
| 5,205,835 A | 4/1993 | Tieckelmann et al. | |
| 5,244,466 A | 9/1993 | Litz et al. | |
| 5,409,570 A | 4/1995 | Griggs et al. | |
| 5,683,794 A | 11/1997 | Wadsworth et al. | |
| 5,695,868 A | 12/1997 | McCormack | |
| 5,888,352 A | 3/1999 | Yoshikawa et al. | |
| 5,958,186 A | 9/1999 | Holm et al. | |

(Continued)

FOREIGN PATENT DOCUMENTS

| | | | |
|---|---|---|---|
| AU | 006723381 A * | 9/1981 | ............. B01F 7/008 |
| CA | 841938 | 5/1970 | |

(Continued)

OTHER PUBLICATIONS

International Search Report and Written Opinion dated Aug. 11, 2015 for PCT/US2015/031553.
International Search Report and Written Opinion dated Jul. 21, 2015 for PCT/US2015/031551.
International Search Report and Written Opinion dated Jul. 21, 2015 for PCT/US2015/031557.
Mortazavi, S. M., et al.; "Evaluating Simultaneous Desizing and Bleaching of Greige Cotton Fabric Using KMnO4"; Textiel Research Journal; vol. 78, No. 6; p. 497-501; 2008.

(Continued)

*Primary Examiner* — Amina S Khan

(57) ABSTRACT

The present invention is directed to a method for scouring and increasing the brightness of non-wood fibers. The method comprises forming a mixture of non-wood fibers, exposing the mixture to a scouring liquor and a scouring agent comprising oxygen gas to form a scouring mixture, and scouring the scouring mixture by radially circulating the scouring liquor throughout the scouring mixture to provide scoured fibers.

60 Claims, 12 Drawing Sheets

(56) References Cited

U.S. PATENT DOCUMENTS

| | | | |
|---|---|---|---|
| 6,083,739 A * | 7/2000 | Franks | C11D 3/38645 |
| | | | 19/40 |
| 6,136,041 A | 10/2000 | Jaschinski et al. | |
| 6,258,207 B1 | 7/2001 | Pan | |
| 6,302,997 B1 | 10/2001 | Hurter et al. | |
| 6,514,380 B1 | 2/2003 | Laine et al. | |
| 6,524,348 B1 | 2/2003 | Jewell et al. | |
| 6,569,286 B1 | 5/2003 | Withenshaw et al. | |
| 7,044,985 B2 * | 5/2006 | Rizzardi | D06L 4/12 |
| | | | 252/391 |
| 7,481,843 B2 | 1/2009 | Xu | |
| 7,932,196 B2 | 4/2011 | McCormack et al. | |
| 8,591,701 B2 | 11/2013 | Sung et al. | |
| 8,603,802 B2 | 12/2013 | Sung et al. | |
| 2002/0098317 A1 | 7/2002 | Jaschinski et al. | |
| 2003/0226209 A1 | 12/2003 | Fuminori | |
| 2004/0163779 A1 | 8/2004 | Pan | |
| 2004/0256065 A1 | 12/2004 | Ahmed et al. | |
| 2007/0272378 A1 | 11/2007 | Paren et al. | |
| 2010/0139877 A1 * | 6/2010 | Black | A22C 13/0003 |
| | | | 162/146 |
| 2011/0114273 A1 | 5/2011 | Yaqoob et al. | |
| 2013/0276246 A1 * | 10/2013 | Bellini | D06B 5/16 |
| | | | 8/636 |
| 2014/0066872 A1 | 3/2014 | Baer et al. | |

FOREIGN PATENT DOCUMENTS

| | | | | |
|---|---|---|---|---|
| CA | 841938 A | | 5/1970 | |
| CA | 2745606 A1 | | 7/2010 | |
| CN | 86103060 A | | 4/1987 | |
| CN | 1072746 A | | 6/1993 | |
| CN | 101215776 A | | 7/2008 | |
| CN | 102086533 A | | 6/2011 | |
| CN | 103243599 A | | 8/2013 | |
| CN | 103255661 A | | 8/2013 | |
| CN | 103266519 A | | 8/2013 | |
| DE | 10114341 A1 | | 10/2002 | |
| EP | 030158 A1 | | 6/1981 | |
| EP | 0206560 | * | 6/1985 | D21C 9/10 |
| EP | 0206560 A2 | | 12/1986 | |
| EP | 0526383 A1 | | 3/1993 | |
| EP | 931862 A1 | | 7/1999 | |
| EP | 1780316 A2 | | 2/2007 | |
| GB | 412470 A | | 6/1934 | |
| JP | 2002363878 A | | 12/2002 | |
| JP | 2008013859 A | | 1/2008 | |
| WO | 9954544 A1 | | 10/1999 | |
| WO | 0012810 A1 | | 3/2000 | |
| WO | 2001016423 A1 | | 3/2001 | |
| WO | 0246522 A2 | | 6/2002 | |
| WO | 2005025865 A1 | | 3/2005 | |
| WO | 2007140578 A1 | | 12/2007 | |
| WO | 2008105603 | | 9/2008 | |
| WO | 2013033405 A1 | | 3/2013 | |

OTHER PUBLICATIONS

Lystad, Elizabeth; "TCF-Bleaching of Softwood Chemical Pulps with Permanganate"; International Pulp Bleaching Conference; p. 357-370; 1996.

Hietanan, Tomi M., et al.; "Effects on Pulp Properties of Magnesium Hydroxide in Peroxide Bleaching"; BioResources; vol. 8, No. 2; p. 2337-2350; 2013.

Khristova, P., et al; "Multistage Peroxide Bleaching of French Hemp"; Industrial Crops and Products; vol. 18; p. 101-110; 2003.

European Supplementary Search Report, Communication dated Nov. 20, 2017, Application No./Patent No. 15796776.1-1308 / 3146110 PCT/US2015031557, pp. 1-9.

How is pulp made? | UPM Pulp, https://www.upmpulp.com/sustainable-pulp/how-is-pulp-made/, Oct. 3, 2018, 6 pgs.

Paper Pulp Technical Manual (English translation), Japan Technical Association of the Pulp and Paper Industry, Jan. 30, 1992, 5th edition, 2 pages.

"Papermaking Translation Series vol. 12" (Compilation Room of Paper Industry Administration of the Ministry of Light Industry, p. 58, Light Industry Press, Feb. 1960). Chinese reference.

Papermaking Translation Series vol. 12 (Compilation Room of Paper Industry Administration of the Ministry of Light Industry, p. 58, Light Industry Press, Feb. 1960). English Translation.

Hamiltyon et al., Secondary Fibers and Non-Wood Pulping, 1987, The Joint Textbook Committee of the Paper Industry, 1987; p. 11.

Ahmed et al., Biomechanical Pupling of Kenaf, 1999, TAPP Pulping Conference, 285-290.

Batra, Subhash K., et al., "Introduction to Nonwovens Technology", DEStech Publications, Inc., 2012; 38 pages.

Floyd, Don E.; "Polyamide Resins", Reinhold Plastics Applications Series, 2nd Ed. Jul. 27, 1966, 119 pages.

Seungsin Lee, et al. "Antimicrobial and Blood Repellant Finishes for Cotton and Nonwoven Fabrics Based on Chitosan and Fluoropolymers", Textile Research Journal, 69(2), 104-112 (1999).

Smook, Handbook for Pulp and Paper Technologies, 1992, Angus Wilde Publications, 2nd edition, chapter 5.

Smook, Handbook for Pulp and Paper Technologies, 1992, Angus Wilde Publications, 2nd edition, chapter 11.

Soap & Cosmetics New Ideas for Successful Product Development, New Chemical Perspectives, Chemical Week Publication, Mar. 2000; 4 pages.

Harwood, Ray, et al.; "Cottonisation of Flax; 2008 International Conference on Flax and Other Bast Plants"; p. 118-128; 2008.

Common Knowledge (1) Deep Processing of Chemical Organic Material, Hong Zhongling, p. 266, Beijing: Chemical Industry Press Jun. 1997; (English translation).

Common Knowledge (2) The World of Paper, Liu Shao, p. 43, Fujian Schience & Technology Publishing House, Jun. 1994; (English translation).

Common Knowledge (3) Processing Chemistry of Natural Textile Fibers, Deng Yimin, pp. 129-133, Chongqing: Southwest Normal University Press, Aug. 2010; (English translation).

Common Knowledge (4) "Textile Materials", Zhang Yixin, pp. 50-53, Beijing: China Textile Press, Jul. 2009; (English translation).

* cited by examiner

BLEACHING AND SHIVE REDUCTION PROCESS FOR NON-WOOD FIBERS

CROSS REFERENCE TO RELATED APPLICATION

This application claims benefit of U.S. Provisional Patent Application Ser. No. 61/000,846, filed May 20, 2014, which is incorporated herein in its entirety by reference.

TECHNICAL FIELD

The instant invention generally is related to methods for fiber production. More specifically, the instant invention is related to methods for non-wood fiber scouring methods.

BACKGROUND OF THE INVENTION

Plant fibers fall into three groups: seed fibers (e.g., cotton and kapok), stem fibers (bast fibers, e.g., flax and hemp), and leaf fibers (e.g., sisal and kenaf). Bast fibers occur as bundles of fibers, which extend through the length of the plant stems, located between the outer epidermal "skin" layers and the inner woody core (cortex) of the plant. Therefore, bast fiber straw includes three primary concentric layers: a bark-like skin covering layer, a bast fiber layer, and an inner, woody core. The woody core has various names, which depends on the particular plant type. For example, the flax woody core is referred to as "shive." Thus, "shive" refers to all woody-core materials contained in bast fiber plants.

The bundles of fibers are embedded in a matrix of pectins, hemi-celluloses, and some lignin. The lignin must be degraded, for example by "retting" (partial rotting) of the straw, for example by enzymes produced by fungi (e.g., during dew-retting), or bacteria (e.g., during water-retting). Decortication involves mechanically bending and breaking the straw to separate the fiber bundles from the shive and skin layers, and then removing the non-fiber materials using a series of conventional mechanical cleaning stages.

A substantial proportion of the pectin-containing material that surrounds the individual bast fibers is pectin, with the remaining portion being primarily various water-soluble constituents. Pectin is a carbohydrate polymer, which includes partially-methylated poly-galacturonic acid with free carboxylic acid groups present as calcium salts. Pectin is generally insoluble in water or acid, but may be broken down, or hydrolyzed, in an alkaline solution, such as an aqueous solution of sodium hydroxide.

Removal of the pectin-containing material, or gum, is necessary in many instances to utilize the fiber for its intended purposes. Various methods for pectin removal include degumming, or removing, the pectin-containing substances from the individual bast fiber. For example, U.S. Pat. No. 2,407,227 discloses a retting process for the treatment of fibrous vegetable or plant material, such as flax, ramie, and hemp. The retting process employs micro-organisms and moisture to dissolve or rot away much of the cellular tissues and pectins surrounding fiber bundles, facilitating separation of the fiber bundles from the shive and other non-fiber portions of the stem. Thus, the waxy, resinous, or gummy binding substances present in the plant structure are removed or broken down by means of fermentation.

Following retting, the stalks are broken, and then a series of chemical and mechanical steps are performed to produce individual or small bundles of cellulose fiber. Scouring is a cleaning procedure that removes impurities from fibers (e.g., natural impurities, such as wax and pectin, and contaminants, such as microbes). Typically, scouring is performed by exposing fibers to chemicals in a sealed, temperature and pressure-controlled chamber, such as a fiber processing kier.

However, a common problem still occurring in non-wood fiber processes is the occurrence shives, which are undesirable particles in finished paper products. Shives includes pieces of stems, "straw," dermal tissue, epidermal tissue, and the like. Shives are substantially resistant to defiberizing processes, rendering their presence problematic. Even following oxidative bleaching, shives continue to have deleterious effects on the appearance, surface smoothness, ink receptivity, and brightness of a finished paper product. Mechanical removal of shive to the level required for a high value product involves the application of significant mechanical energy, which results in fiber breakage and generation of fines, or small cellulose particles. The fines are a yield loss, increasing the production cost. Further, the broken fibers reduce the overall fiber strength so they either cannot be used in some manufacturing processes and/or result in weak textile or paper products.

Thus, conventional methods of non-wood fiber processing are not sufficiently robust to remove, decolorize, and break up the residual shive present in the fibers. Thus, processed and finished fibers can still include particles of shive, which are both aesthetically unattractive and reduce the commercial value of the fiber product. Furthermore, conventional bleaching processes are not sufficiently robust to increase paper brightness to sufficient levels required for commercial products.

Accordingly, there exists an on-going need for a method to both adequately bleach and sufficiently reduce shive presence in non-wood fibers. Thus, the present invention is directed to meeting this and other needs and solving the problems described above.

SUMMARY OF THE INVENTION

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

In one aspect of the present invention, a method for scouring and increasing the brightness of non-wood fibers comprises forming a mixture of non-wood fibers, exposing the mixture to a scouring liquor and a scouring agent comprising oxygen gas to form a scouring mixture, and scouring the scouring mixture by, for example, radially circulating the scouring liquor throughout the scouring mixture in a chamber to provide scoured fibers.

In another aspect, a method for increasing the brightness of non-wood fibers comprises forming a mixture of non-wood fibers and scouring the mixture in the presence of a scouring agent comprising oxygen gas to provide scoured and brightened fibers. The resulting scoured and brightened fiber has a brightness in a range between about 30 and about 60 as measured by Technical Association of the Pulp and Paper Industry (TAPPI) 525 standard test method.

Yet in another aspect, a method of reducing the amount of residual shive in non-wood fibers comprises forming a mixture of non-wood fibers and scouring the mixture in the presence of a scouring agent comprising oxygen gas to provide scoured and low-shive fibers. The low-shive fibers have less visible shive content than the fibers of the mixture before exposure.

Other advantages and capabilities of the invention will become apparent from the following description taken in conjunction with the examples showing aspects of the present invention.

BRIEF DESCRIPTION OF THE DRAWINGS

The invention will be better understood and the above object as well as other objects other than those set forth above will become apparent when consideration is given to the following detailed description thereof. Such description makes reference to the annexed drawing wherein.

DETAILED DESCRIPTION OF THE INVENTION

Figure 1:
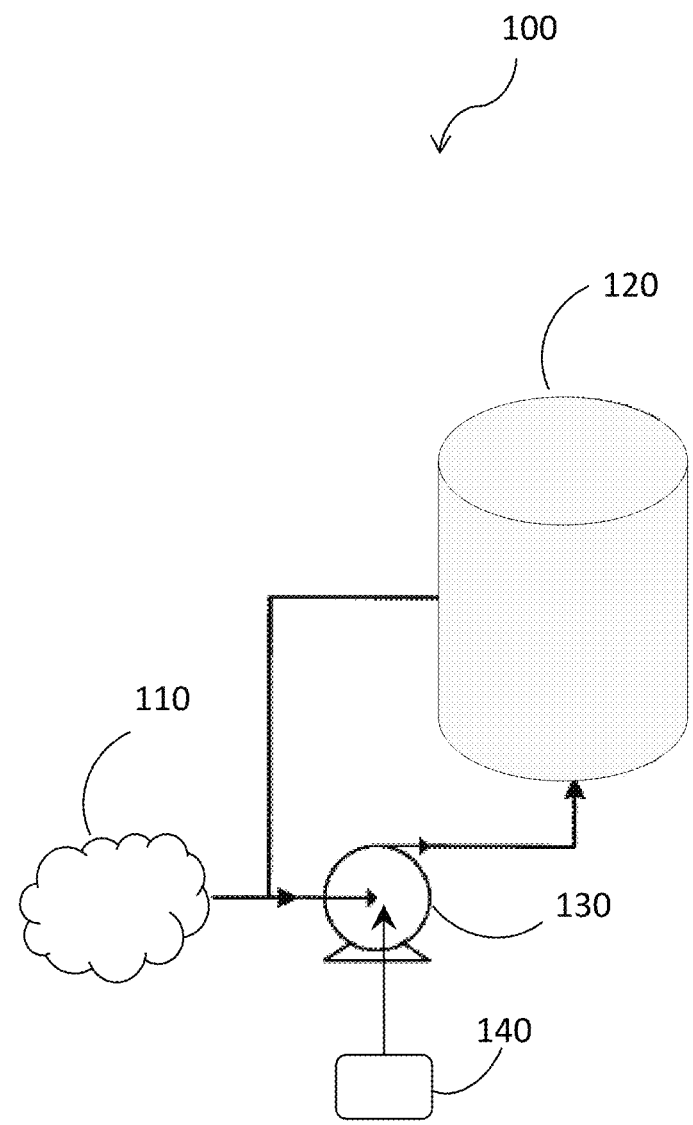
FIG. 1 is an illustration of a method for introducing oxygen gas into a kier using a circulation pump to mix and dissolve the oxygen.

For a fuller understanding of the nature and desired objects of this invention, reference should be made to the above and following detailed description taken in connection with the accompanying figures. When reference is made to the figures, like reference numerals designate corresponding parts throughout the several figures.

In one aspect of the present invention, a method for scouring and increasing the brightness of non-wood fibers comprises forming a mixture of non-wood fibers, exposing the mixture to a scouring liquor and a scouring agent comprising oxygen gas to form a scouring mixture, and scouring the scouring mixture by radially circulating the scouring liquor throughout the scouring mixture to provide scoured fibers.

In another aspect, a method for increasing the brightness of non-wood fibers comprises forming a mixture of non-wood fibers and scouring the mixture in the presence of a scouring agent comprising oxygen gas to provide scoured and brightened fibers. The brightened fibers have a brightness in a range between about 30 and about 60 as measured by TAPPI 525 standard test method. The higher brightness achieved in the scouring step can also eliminate the need for a bleaching step, as the brightness may be high enough for many applications. Optionally, subsequent bleaching steps, including bleaching with oxidizing agents and/or bleaching with a reducing agent, can be performed to further increase brightness of the fibers. The additional bleaching steps also can be performed in the presence of oxygen gas.

Yet in another aspect, a method of reducing the amount of residual shive in non-wood fibers comprises forming a mixture of non-wood fibers and scouring the mixture in the presence of a scouring agent to provide scoured and low-shive fibers. The scouring agent is oxygen gas, an organic acid, or a combination of the oxygen gas and the organic acid, and the scoured and low-shive fibers have less visible shive content than the fibers of the mixture before exposure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, "about" means within 5% of the reported numerical value.

As used herein, the terms "percent by weight," "% by weight," and "wt. %" mean the weight of a pure substance divided by the total dry weight of a compound or composition, multiplied by 100. Typically, "weight" is measured in grams (g). For example, a composition with a total weight of 100 grams, which includes 25 grams of substance A, will include substance A in 25% by weight.

As used herein, the term "non-wood fibers" means fibers produced by and extracted from a plant or animal, with the exception that such fibers do not include wood fibers, i.e., derived from a tree, and man-made fibers formed from cellulose, e.g. viscose. Non-limiting examples of suitable non-wood fibers are plant-based, non-wood fibers, such as bast fibers. Bast fibers include, but are not limited to, flax fibers, hemp fibers, jute fibers, ramie fibers, nettle fibers, Spanish broom fibers, kenaf plant fibers, or any combination thereof. Non-wood fibers include seed hair fibers, for example, cotton fibers. Non-wood fibers can also include animal fibers, for example, wool, goat hair, human hair, and the like.

As used herein, the term "nonwoven" means a web or fabric having a structure of individual fibers or threads which are randomly interlaid, but not in an identifiable manner as in the case of a knitted or woven fabric. Examples of suitable nonwoven fabrics or webs include, but are not limited to, meltblown webs, spunbound webs, bonded carded webs, airlaid webs, coform webs, hydraulically entangled webs, and so forth.

As used herein, the term "kier" means a circular boiler or vat used in processing, bleaching and/or scouring non-wood fibers. As used herein, the term "scour," "scouring," or "scoured" refers to a cleaning procedure that removes impurities from fibers (e.g., natural impurities, such as wax and pectin, and contaminants, such as microbes). Typically, scouring is performed by exposing fibers to chemicals in a sealed, temperature and pressure-controlled chamber. Subsequently, the fiber can be bleached to decolorize impurities and increase the fiber brightness.

As used herein, the term "scouring liquor" means an aqueous composition used in the scouring process. The scouring liquor can be of any composition known to those in the art for scouring non-wood fibers and can have a neutral or alkali pH. The scouring liquor can include an alkali, for example sodium hydroxide, magnesium hydroxide, or a combination thereof. Other non-limiting examples of suitable components include sodium carbonate, magnesium sulfate, surfactants, or any combination thereof.

As used herein, the term "scouring agent(s)" means oxygen gas, an organic acid or salt thereof, or any combination thereof. The oxygen gas and organic acid can be utilized in the scouring agent in a sequence. For example, the non-wood fibers can be exposed to the oxygen gas and then the organic acid in a sequence. Alternatively, the non-wood fibers can be exposed to organic acid in a pre-treatment step before scouring with oxygen gas. The scouring agent can further include other gases, for example nitrogen or carbon dioxide. The oxygen gas can be present as a mixture with other gases. In one example, the oxygen gas is present in the scouring agent about or in any range between about 75, 80, 85, 90, 95, and 100%.

As used herein, the term "brightness" refers to the whiteness of a composition of fibers. Brightness can be determined by TAPPI 525 test method. Briefly, the fiber is dried using warm air and then carded. The fiber brightness is determined using a Datacolor SF600 Plus-CT reflectance spectrophotometer. Four measurements of each sample are averaged. The sample is illuminated with a CIE D65 source through a 20 min diameter aperture. The observer conditions are 10° visual field, with the specular component being included, and the UV filter in an off position. The TAPPI 525 brightness value (also the CIE whiteness index and CIE L*a*b* values) is calculated using ColorTools QC software.

Another method of measuring brightness includes the "MacBeth UV-C" test method, utilizing a Macbeth 3100 spectrophotometer, commercially available from X-Rite, Inc., Grand Rapids, MI. UV-C is the illuminant (lamp) used for brightness testing. As used herein, the term "gain" means the increase in fiber brightness following a bleaching process. Brightness and gain measurements of the fibers, before and after exposure to the brightening agent, are conducted on thick pads of the fiber. The fiber pads are prepared by diluting the fibers to a consistency in a range between about 2% and about 10% with water, mixing to separate the fibers, and then de-watering the fibers, for example on a Buchner funnel with a filter paper, to form the fiber pad. The fiber pad can be further dewatered by pressing between blotters in a laboratory press and then dried on a speed dryer to form a dry cake. The fiber pads can then be air-dried for several days prior to brightness testing. Brightness measurements also can be done on the fiber by: 1) drying the fiber with hot air to less than 2-4% moisture, 2) carding the fiber to straighten out and align the fibers into a mat, lap or sliver, and 3) measuring the brightness of the lap, mat or sliver. Brightness and gain testing of the fibers according to the MacBeth UV-C brightness standard is conducted before and after exposure to the brightening agent, with the brightened fibers having a brightness greater than the fibers before exposure. The MacBeth test measures both TAPPI brightness and LAB whiteness. L* is the whiteness/lightness, and a* and b* are the color (red-green and blue-yellow). A* and b* values close to 0 indicate very low color/no color. The UV-C test measures the illuminate, including the both the ultraviolet and color components of the light.

As used herein, the term "gain" means the increase in fiber brightness following a bleaching process.

As used herein, the term "consistency" means to the percent (%) solid in a composition comprising a solid in a liquid carrier. For example, the consistency of a fiber composition weighing 100 grams and comprising 50 grams of fibers has a consistency of 50%.

As used herein, the terms "cellulose fibers," "cellulosic fibers," and the like refer to any fibers comprising cellulose. Cellulose fibers include secondary or recycled fibers, regenerated fibers, or any combination thereof.

Conventional non-wood fiber production involves mechanical removal of non-fiber shive material, followed by chemical removal of pectin and a mild oxidative bleaching step. Plants, including flax, require an initial "retting" step before mechanical removal of non-fiber material. The retting process employs micro-organisms and moisture to dissolve or rot away much of the cellular tissues and pectins surrounding fiber bundles, thus facilitating separation of the fiber from the stem. Thus, waxy, resinous, or gummy binding substances present in the plant structure are removed or broken down by means of fermentation. Pectin removal can be accomplished using an alkaline agent, such as sodium hydroxide, at elevated temperatures. Enzymes and other chemicals, such as detergents and wetting agents, also can be added to enhance pectin detachment from the fibers. U.S. Pat. Nos. 8,603,802 and 8,591,701 and Canadian Patent No. CA 2,745,606 disclose methods for pectin removal using enzymes. Following the pectin extraction step, the fibers are washed and treated with a mixture of hydrogen peroxide and sodium hydroxide to increase the brightness and whiteness of the finished fiber.

However, there are drawbacks to these conventional methods. First, available pectin extraction and bleaching steps are not robust enough to decolorize and/or break up residual shive in the fiber. Second, the bleaching process also is not robust enough to increase the brightness to levels required for high quality commercial products. The result is finished fibers containing dark shive particles, which is aesthetically unappealing and reduces the commercial value of the fiber product. The shive also interferes with the manufacturing processes which utilize the fiber. For example, particles of shive can plug the filters on a hydro entanglement system. The shive also has very low bonding ability. Thus, any shive entrained in the finished product be unappealing to the end user. Further, residual shive could also be a potential source of contamination when used, for example, in food service wipes.

In particular, the only way current method to remove the shive is extensive mechanical cleaning and carding, which is expensive, causes fiber damage, and reduces yield. In contrast, the inventive process disclosed herein enhances one of the existing process steps, reducing or even eliminating the need for the additional mechanical removal steps.

One commercially available solution to the shive problem is to either increase the intensity of the mechanical shive removal process or to add multiple mechanical removal stages so that the residual shive content is low enough to be imperceptible in the finished product. However, this solution has drawbacks. First, additional mechanical processing increases the operating and capital costs of production. Second, the additional mechanical processing damages the fragile fibers, resulting in a product with inferior tensile strength properties. Finally, additional mechanical processing reduces the yield of the finished fiber because of the generation of fines, or small cellulose particles, and long fiber losses due to the inherent inefficiency of mechanical processing.

As disclosed herein, exposing fibers to oxygen gas during or at the end of the scouring process increases the brightness of the fibers and reduces the residual shive to levels that dramatically reduce the impact of shive on the appearance of the finished fiber. Furthermore, and without being bound by theory, it is believed that the scouring process disclosed herein reduces the integrity of the shives so that they are more easily broken up and removed in mechanical treatment. Reduced shive content after exposure to the scouring agent, which includes oxygen gas, can be assessed by visual examination of the fibers. To further increase brightness, the fibers can be pre-treated with an organic acid, or exposed to the organic acid after scouring in the presence of oxygen gas.

Furthermore, the disclosed process provides a significantly higher brightness compared to conventional processes, which results in production of fibers with higher commercial value. Thus, the process can be used to produce a commercially useful fiber from low quality raw materials that cannot be suitably processed with conventional processes. Moreover, the process is suitable for a variety of lower value plant fiber raw materials that cannot be transformed into a commercially useful fiber without using other processes. The effectiveness of oxygen gas addition during fiber scouring allows for a significant reduction in the amount of alkali required to effectively scour fibers, while still providing a competitive brightness result. Further, the effectiveness of oxygen gas addition during fiber scouring allows for a significant reduction in the temperature required to effectively scour fibers, which increases Fiber brightness and reduces fiber damage. Thus, the fibers maintain high fiber strength throughout the process.

One type of non-wood fibers is bast fibers. Bast fibers are found in the stalks of the flax, hemp, jute, ramie, nettle, Spanish broom, and kenaf plants, to name a few. Typically, native state bast fibers are 1 to 4 meters in length. These long native state fibers are comprised of bundles of straight individual fibers that have lengths between 20-100 millimeters (mm). The bundled individual fibers are glued together by pectins (a class of plant resins).

Bast fibers bundles can be used for both woven textiles and cordage. An example of a woven textile produced with flax bast fiber bundles is linen. More recently, as provided in U.S. Pat. No. 7,481,843, partially separated bast fiber is produced to form yarns and threads for woven textiles. However, yarns and threads are not suited for nonwoven fabrics.

Any non-wood fibers can be used in the present invention. In one example, suitable fibers include cotton fibers, bast fibers, or any combination thereof. Bast fibers can be derived from a variety of raw materials. Non-limiting examples of suitable bast fibers include, but are not limited to, flax fibers, hemp fibers, jute fibers, ramie fibers, nettle fibers, Spanish broom fibers, kenaf plant fibers, or any combination thereof. Secondary or recycled fibers from waste paper can be used.

Initially, pectin can be substantially removed from pectin-containing non-wood fibers to form substantially individualized fibers. Thus, the fibers are rendered substantially straight and are substantially pectin-free. The fibers can be individualized, by pectin removal, using mechanical or chemical means.

Enzymatic treatment is a non-limiting example of a chemical treatment that can be used to substantially remove pectin. PCT International Publication No. WO 2007/140578, which is incorporated herein in its entirety by reference, describes a pectin removal technology which produces individualized hemp and flax fiber for application in the woven textile industry. The process to remove pectin described in WO 2007/140578 can be employed in the invention described herein to produce substantially individualized non-wood fibers.

Individualized non-wood fibers can have less than 10% by weight of the pectin content of the naturally occurring fibers from which the substantially pectin-free fibers are derived. In another aspect, individualized non-wood fibers have less than 15% by weight of the pectin content of the naturally occurring fibers from which the substantially pectin-free fibers are derived. Still, in another aspect, individualized non-wood fibers have less than 20% by weight of the pectin content of the naturally occurring fibers from which the substantially pectin-free fibers are derived. Still, in another aspect, individualized non-wood fibers have less than 0.1% by weight, less than 0.15% by weight, or less than 0.20% by weight, of the pectin content of the naturally occurring fibers from which the substantially pectin-free fibers are derived. In one aspect, the individualized non-wood fibers have less than about 20%, 19%, 18%, 17%, 16%, 15%, 14%, 13%, 12%, 11% 10%, 9%, 8%, 7%, 6%, 5%, 4%, 3%, 2%, 1%, 0.5%, and 0.25% by weight of the pectin content of the naturally occurring fibers from which the substantially pectin-free fibers are derived.

The non-wood fibers can have a mean length in a range between about 0.5 and 500 mm depending on the characteristics of the particular fibers and the cut length of the plant stalks prior to chemical processing. In one aspect, the individualized non-wood fibers have a mean length of at least 7 mm, at least 8 mm, at least 9 mm, and at least 10 mm. In another aspect, the individualized non-wood fibers have a mean length greater than 12 mm. Still yet, in another aspect, the non-wood, plant based fibers have a mean length about or in a range between about 1, 2, 3, 4, 5, 6, 7, 8, 9, 10, 11, 12, 13, 14, 15, 16, 17, 18, 19, and 20, 50, 100, 125, 150, 175, 200, 225, 250, 275, 300, 325, 350, 325, 350, 375, 400, 425, 450, 475, and 500 mm.

In addition to non-wood fibers, the fiber mixture can include fibers derived from one or more source, including, but not limited to, cellulosic fibers, including staple fibers and regenerated cellulose, and thermoplastic fibers. Optionally, the cellulosic fibers are secondary, recycled fibers. Non-limiting examples of cellulosic fibers include, but are not limited to, hardwood fibers, such as hardwood kraft fibers or hardwood sulfite fibers; softwood fibers, such as softwood kraft fibers or softwood sulfite fibers; or any combination thereof. Non-limiting examples of regenerated cellulose include rayon, lyocell, (e.g., TENCEL®), Viscose®, or any combination thereof. TENCEL® and Viscose® are commercially available from Lenzing Aktiengesellschaft, Lenzing, Austria.

In one aspect, the mixture of non-wood fibers includes synthetic, polymeric, thermoplastic fibers, or any combination thereof. Thermoplastic fibers include the conventional polymeric fibers utilized in the nonwoven industry. Such fibers are formed from polymers which include, but are not limited to, a polyester such as polyethylene terephthalate; a nylon; a polyamide; a polypropylene; a polyolefin such as polypropylene or polyethylene; a blend of two or more of a polyester, a nylon, a polyamide, or a polyolefin; a bi-component composite of any two of a polyester, a nylon, a polyamide, or a polyolefin; and the like. An example of a bi-component composite fiber includes, but is not limited to, a fiber having a core of one polymer and a sheath comprising a polymer different from the core polymer which completely, substantially, or partially encloses the core.

Brightness measurements of the fibers, before and after subjecting the fibers to the inventive scouring method, can be conducted on thick pads of the fiber. The fiber pads can be prepared by diluting the fibers to a consistency in a range between about 1% and about 10% with water, mixing to separate the fibers, and then de-watering the fibers, for example on a Buchner funnel with a filter paper, to form the fiber pad. The fiber pad can be further dewatered by pressing between blotters in a laboratory press and then dried on a speed dryer to form a dry cake. The fiber pads can then be air-dried for several days prior to brightness testing.

Brightness testing of the fibers according to the TAPPI 525 test method is conducted before and after scouring, and following optional subsequent bleaching steps. After being subjected to the presently disclosed scouring method, the fibers have a brightness greater than the fibers before scouring. After scouring, the fibers can have a brightness in a range between about 25 and about 60 as measured by the TAPPI 525 standard. In one aspect, the brightened fibers after scouring have a brightness in a range between about 35 and about 60. In another aspect, after scouring the brightened fibers have a brightness in a range between about 45 and about 60. Yet, in another aspect, after scouring the fibers have a brightness in a range between about 40 and about 50. Still yet in another aspect, the brightened fibers have a brightness about or in any range between about 25, 30, 35, 40, 45, 50, 55, and 60 as measured by the TAPPI 525 standard.

The brightness gain, or increase in fiber brightness following scouring is in a range between about 10 and about 50 as measured by TAPPI 525 standard. In one aspect, the brightness gain is in a range between about 20 and about 40 as measured by TAPPI 525 standard. In another aspect, the brightness gain is in a range between about 15 and about 30 as measured by TAPPI 525 standard. Yet, in another aspect, the brightness gain is about or in any range between about 10, 15, 20, 25, 30, 35, 40, 45, and 50 as measured by TAPPI 525 standard.

The brightened fibers of the present invention can be used for any nonwoven fabric products or textiles, including air-laid, carded, spunbonded, and hydroentangled substrates. In one aspect, a nonwoven fabric comprises non-wood fibers having a brightness in a range between about 30 and about 60 as measured by TAPPI 525 standard test method.

Non-wood fiber brightening can be accomplished by 1) retting, mechanical separation and cleaning of bast fibers, scouring as disclosed herein, and one or two stage brightening/bleaching; or 2) retting, mechanical separation and cleaning of bast fibers, scouring as disclosed herein, conventional peroxide or other bleaching/pre-bleaching, and one or two stage bleaching; or 3) retting, mechanical separation and cleaning of bast fibers, scouring as disclosed herein, treatment with an organic acid as disclosed herein, and one or two stage bleaching; or 4) picking, ginning, scouring as disclosed herein, and one or two stage bleaching.

Then, the non-wood fibers are combined to form a mixture. Pectin removal by chemical methods can be performed before or after forming the mixture. The mixture can be formed into a fibrous mat, a fiber mat, a fiber pad, a thick fiber pad, a wet cake, or a "donut" when used in a kier based system. Optionally, the mixture can then be wetted before exposing the mixture to the brightening agent. The mixture can be diluted to any desired consistency, wetted, and/or combined with any desired additives, non-limiting examples of which are mentioned below.

In the mixture before scouring, the fibers have a consistency in a range between about 10% and about 50%. In one aspect, the fibers in the mixture have a consistency in a range between about 10% and about 30%. In another aspect, the fibers in the mixture have a consistency in a range between about 15% and about 35%. Yet in another aspect, the fibers in the mixture have a consistency in a range between about 20% and about 40%. Still yet, in another aspect, the fibers in the mixture have a consistency about or in any range between about 10, 12, 15, 17, 20, 22, 25, 27, 30, 32, 35, 37, 40, 42, 45, 47 and 50%.

In a fiber processing kier system, the bleaching liquor, or liquid, to fiber ratio can be in a range between about 10:1 to about 20:1. In one aspect, the liquor/liquid to fiber ratio is in a range between about 5:1 to 6:1. In another aspect, the liquor/liquid to fiber ratio is in a range between about 12:1 to about 18:1. However, lower liquor/liquid to fiber ratios, i.e., 5:1 compared to 10:1, may provide more desirable results.

To increase the brightness of the fibers, the fiber mixture is scoured and exposed to a scouring agent, the scouring agent being oxygen gas, an organic acid, or a combination of oxygen gas and organic acid. The fiber mixture can be exposed to the scouring agent by any suitable method.

Treating fibers with the scouring agent comprising oxygen gas, before, during, or at the beginning and/or end of scouring provides a substantial improvement in the brightness of the fibers, as well as reduces dark color and the structural integrity of shive contaminants. Although brightness is increased following the inventive scouring process, additional subsequent bleaching stages can further increase the brightness.

The fibers can be soaked in, rinsed with, or exposed to the organic acid at any temperature, including room temperature or any temperature above room temperature. The organic acid can be any organic acid or salt thereof. Non-limiting examples of the organic acid include acetic acid, citric acid (and citrate salts), formic acid, lactic acid, oxalic acid, uric acid, or any combination thereof. A wide variety of citrate salts can be employed, such as alkali metal and alkaline-earth metal citrate salts. Non-limiting examples of suitable citrate salts include calcium citrate, tri-sodium citrate, or any combination thereof. Optionally, the citrate salt is compounded with other materials.

The organic acid or salt thereof can be added to the fibers in an amount in a range between about 0.1 and about 10 wt.

% based on the dry weight of the fibers. In one aspect, the organic acid or salt thereof is added in an amount in a range between about 1 and about 5 wt. % based on the dry weight of the fibers. In another aspect, the organic acid or salt thereof is added in an amount in a range between about 2 and about 8 wt. % based on the dry weight of the fibers. Yet, in another aspect, the organic acid or salt thereof is added in an amount about or in any range between about 0.1, 0.5, 1, 1.5, 2, 2.5, 3, 3.5, 4, 4.5, 5, 5.5, 6, 6.5, 7, 7.5, 8, 8.5, 9, 9.5, and 10 wt. % based on the dry weight of the fibers.

The scouring liquor can have an alkali or a neutral pH. In one aspect, the scouring liquor has a neutral pH in a range between about 6 and about 8. In another aspect, the scouring liquor has an alkali pH in a range between about 7 and about 12. Yet, in another aspect, the scouring liquor has a pH about or in any range between about 5, 5.5, 6, 6.5, 7, 7.5, 8, 8.5, 9, 9.5, 10, 10.5, 11, 11.5, 12, 12.5, or 13.

The scouring liquor can include an alkali, for example sodium hydroxide, magnesium hydroxide, or a combination thereof, to provide an alkali pH. Other non-limiting examples of suitable components include sodium carbonate, magnesium sulfate, surfactants, or any combination thereof. However, even water alone (neutral pH) can be used in the scouring liquor.

The use of magnesium compounds in the scouring liquor may reduce the potential damage to the fibers that could occur during oxygen exposure. In particular, the use of magnesium sulfate during scouring with oxygen gas enhances the brightness gain and end result, compared to oxygen gas alone. Thus, optionally, magnesium hydroxide can be substituted for sodium hydroxide during scouring.

Given the increased brightness with magnesium sulfate, other magnesium compounds may provide the same result. Other magnesium compounds include any magnesium salts or compounds including magnesium. Non-limiting examples of suitable magnesium compounds include magnesium hydroxide, magnesium oxide, magnesium sulfate, magnesium glycinate, magnesium ascorbate, magnesium chloride, magnesium orotate, magnesium citrate, magnesium fumarate, magnesium malate, magnesium succinate, magnesium tartrate, magnesium carbonate, magnesium hydroxide, or any combination thereof.

The magnesium compound can be added to the scouring liquor or directly to the fibers. The optional magnesium compounds can be added in an amount in a range between about 0.01 and about 5 wt. % based on the total dry weight of the fibers. In one aspect, the magnesium compound is added in an amount in a range between about 0.1 and about 3 wt. % based on the total dry weight of the fibers. In another aspect, the magnesium compound is added in an amount in a range between about 1 and about 4 wt. % based on the total weight of the dry fibers. Yet in another aspect, the magnesium compound is added in an amount about or in any range between about 0.1, 0.5, 1, 1.5, 2, 2.5, 3, 3.5, 4, 4.5, and 5 wt. % based on the total dry weight of the fibers.

Referring to the figures, FIG. 1 illustrates an exemplary method 100 of scouring and exposing the fibers to oxygen gas. Although, the fibers can be exposed to the oxygen gas by any other suitable method known in the art. The scour also can be run in a continuous process.

Initially, dry, non-wood fibers are mixed with water, and, optionally, subsequently centrifuged to remove most of the remaining water. The fibers are disposed within the perforated basket of a fiber processing kier 120. The basket is equipped with a central perforated shaft to enable scouring liquor 140 to be circulated radially through the fibers. The basket is also sealed at the bottom and has a cover to seal at the top to ensure liquor circulation through the fiber mass.

The scouring liquor 140 is prepared and introduced into the fiber processing kier 120 and circulated through the fibers with the circulation pump 140. Optionally, the scouring liquor is pre-heated to 60-70° C. to accelerate the heat-up cycle. In one aspect, the scouring liquor is pre-heated to a temperature in a range between about 50 and about 70° C. In another aspect, the scouring liquor is pre-heated to a temperature in a range between about 55 and about 65° C. Yet in another aspect, the scouring liquor is pre-heated to a temperature in a range between about 50 and about 60. Still yet, in another aspect, the scouring liquor is pre-heated to a temperature about or in any range between about 50, 52, 54, 56, 58, 60, 62, 64, 66, 68, and 70° C. However, the upper temperature limiting is not intended to be limited.

The scouring liquor 140 can be set to circulate from the inside of the basket to the outside of the basket, or from the outside to the inside. The system can be programmed to heat the liquor to the desired treatment temperature and then to hold the system at this temperature for the desired treatment time. Periodically, the scouring liquor flow can be reversed to minimize any channeling in the fiber. Thus, scouring can be performed in a kier comprising an internal liquor circulation system or an external liquor circulation system.

The oxygen gas 110 is injected into the circulation pump 130, which acts to mix and dissolve the oxygen gas 110 into the scouring liquor 140. The oxygen gas 110 can be injected until the desired system pressure is achieved, or until the oxygen gas is dissolved in the solution, forming a dissolved oxygen scouring liquor solution. Alternatively, a low, continuous flow of oxygen can be maintained throughout the process. The oxygen gas can be added at any point in the system, and the oxygen concentration is controlled by adjusting the partial pressure. After scouring, and optional bleaching or brightening steps, the scoured fibers can be dried.

Figure 2:
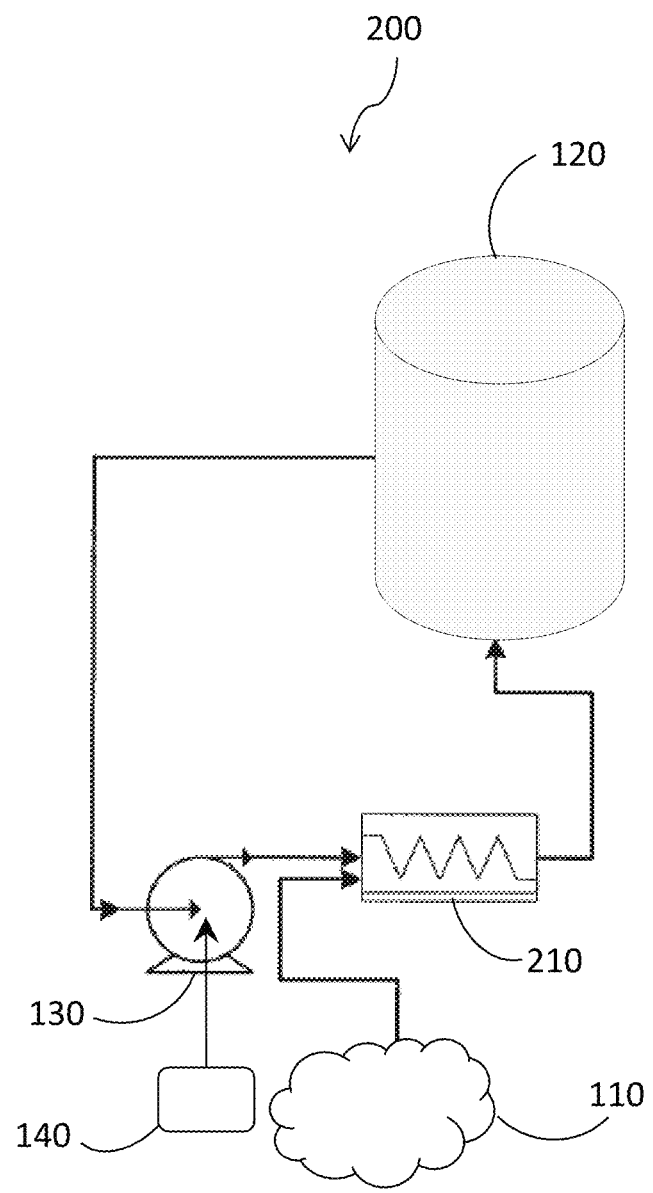
FIG. 2 is an illustration of a method for introducing oxygen into a mixer after the circulation pump.

FIG. 2 illustrates another exemplary method 200 of exposing the fiber mixture to oxygen gas 110. As shown, the oxygen gas 110 is introduced into a static or active mixing system 210 after the circulation pump 130.

After pressurizing the fiber processing kier 120, or any closed system, with oxygen gas, the oxygen can be vented one or more times to flush air from the system. Venting ensures the maximum possible dissolved oxygen concentration.

Figure 3:
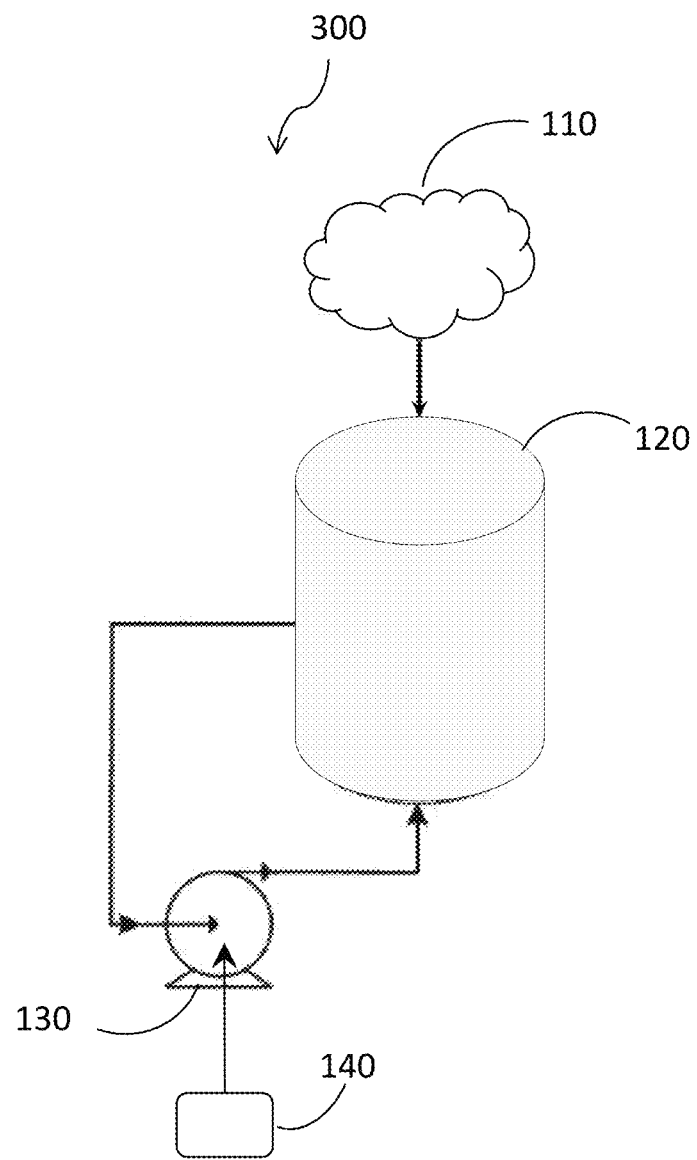
FIG. 3 is an illustration of a method for introducing oxygen directly into the non-wood fibers.

FIG. 3 illustrates another exemplary method 300 of exposing the fiber mixture to the oxygen gas 110 at the end of the scouring process. As shown, oxygen gas 110 is directly introduced into top of the fiber processing Kier 120 after the fiber processing kier 120 is drained of scouring liquor 40. As such, the oxygen gas 110 displaces much of the residual liquor and permeates the fibers. Thus, the oxygen gas 110 takes advantage of the residual heat and scouring chemicals present in the fiber mat and reacts with the chromophores and shive, reducing the content of shive. The partially depleted oxygen can be purged, and a second and/or a third oxygen charge can be added to enhance the liquor displacement and improve the shive reduction and fiber brightness. The system can be maintained under any desired temperature and/or pressure as described above. As a result, the brightness of the fibers increase and the residual shive content decreases, compared to the fibers before scouring.

Figure 4:
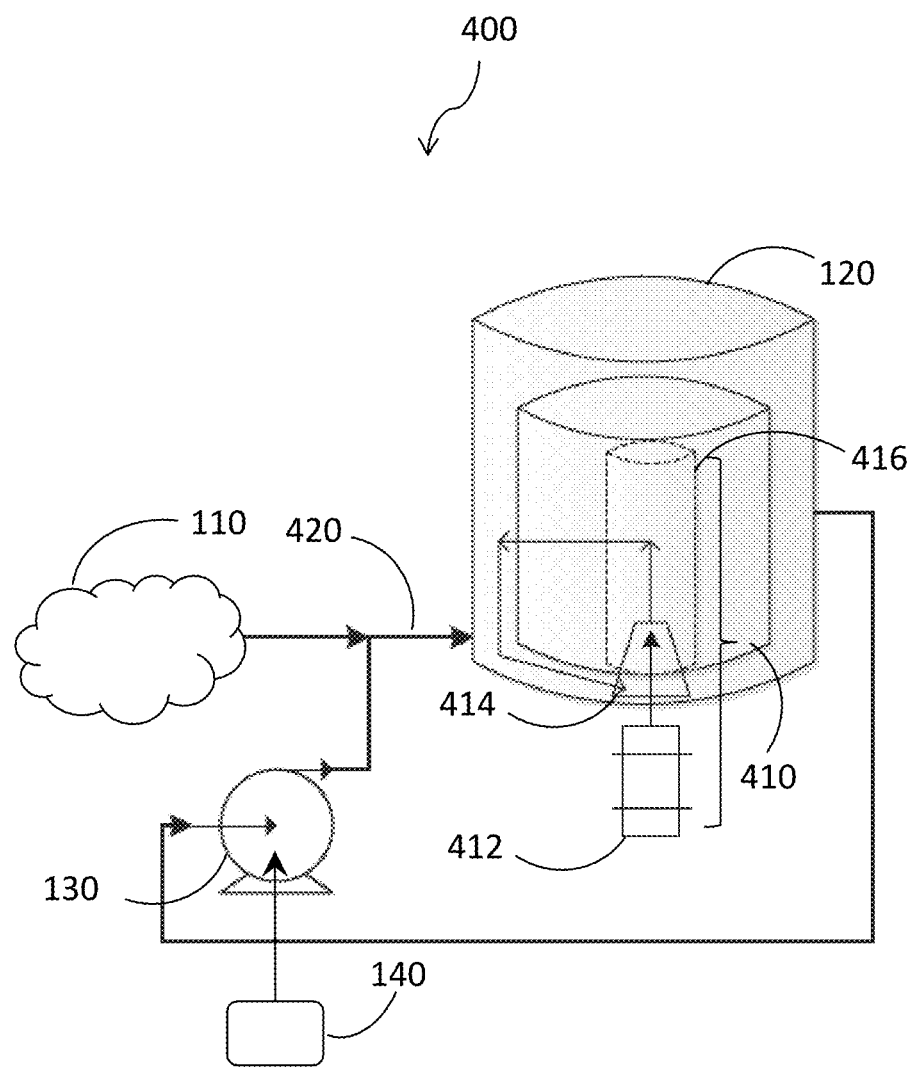
FIG. 4 is an illustration of a method for exposing the non-wood fibers to oxygen using an internal and external liquor circulation system.

FIG. 4 illustrates an exemplary method 400 of exposing the fiber mixture to oxygen gas 110 during scouring. Method 400 has an additional internal circulation system 410 in addition to the external liquor circulation systems of methods 100, 200, and 300 using the liquor circulation pump 130. Oxygen gas 110 is injected into the liquor feed line 420 after the liquor circulation pump 130, which goes directly into the intake of the internal pump 412. The entrained oxygen gas 110 enters the impeller 414, which mixes and dissolves the oxygen gas 110 in the scouring liquor 140. The scouring liquor 140, along with the dissolved oxygen 110 then enters the center shaft 416 of the basket and then travels and circulates through the fiber mass within the fiber processing Kier 120. The scouring liquor 140 moves from the center shaft 416 laterally through the fiber mass and then discharges back into the fiber processing Kier 120, where it can move back to the liquor circulation pump 130 for recirculation.

Figure 5:
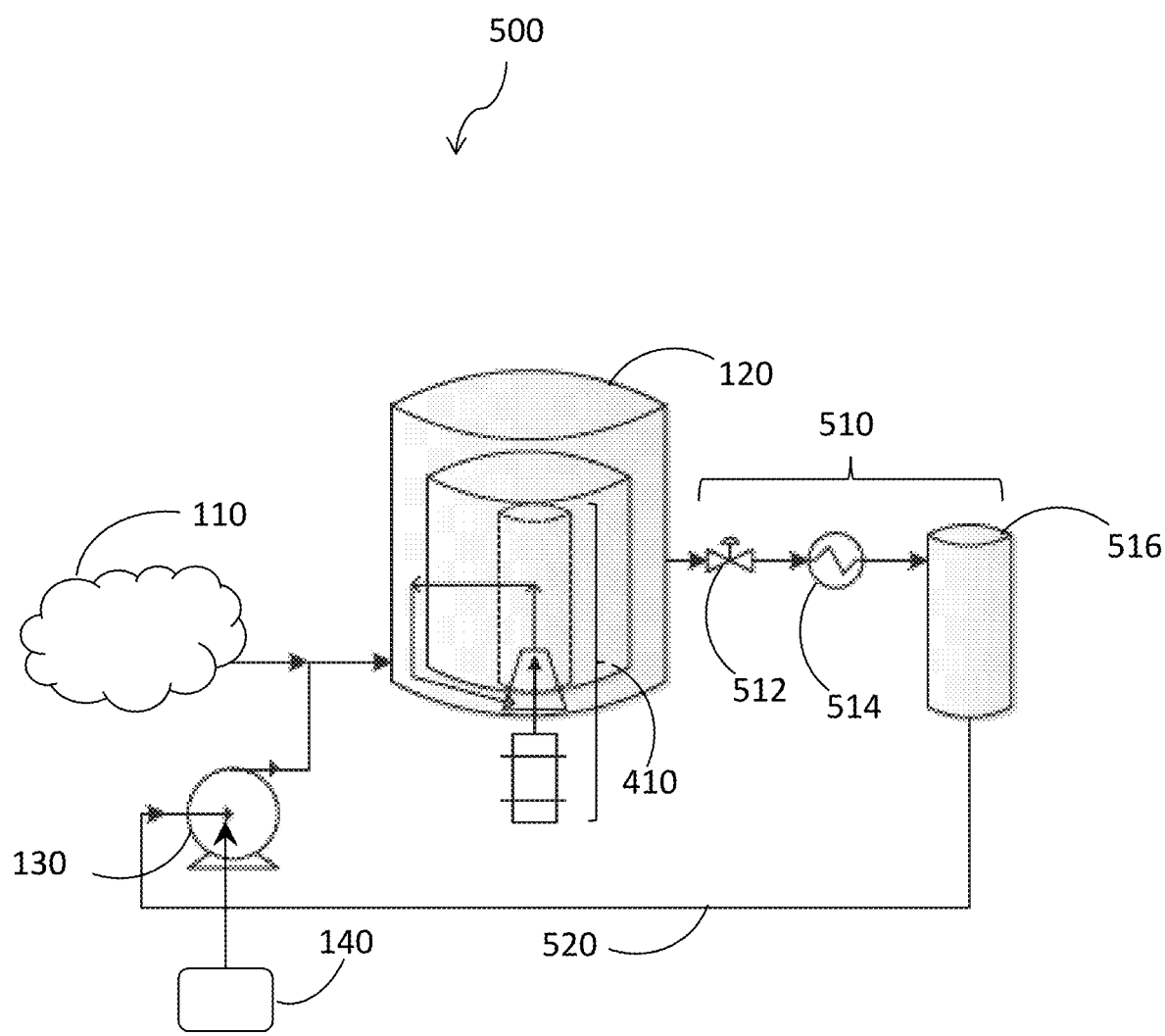
FIG. 5 is an illustration of a method for cooling the liquor in the system of FIG. 4.

FIG. 5 is an illustration of a method 500 for cooling the liquor in the method 400 shown in FIG. 4. In method 500, employing a cooling system 510, the scouring liquor 140 from inside the fiber processing Kier 120 is cooled below the flash temperature, for example, less than about 100° C., in a noncontact heat exchanger 514 and then into a small liquor tank 516. A control valve 512 controls the recirculation of the system and also holds the pressure in the system. The cooled liquor 520 is then pumped back into the liquor circulation pump 130 of the external circulation system. The cooling system 510 allows for addition of chemicals without depressurizing and emptying the fiber processing kier 120.

The above system for cooling can be used for scouring at low temperatures, for example below 110 or below 100° C. In fact, scouring at low temperatures provides desirable brightening and maintains fiber strength, compared to scouring at higher temperatures. For low temperature scouring with oxygen, the temperature can be less than or in any range between about 105, 95, 90, 85, 80, and 75° C. However, for wool fibers or other protein-based fibers, the temperature can be less than about 75° C. Optionally, magnesium sulfate can be included in the scouring liquor.

Figure 6:
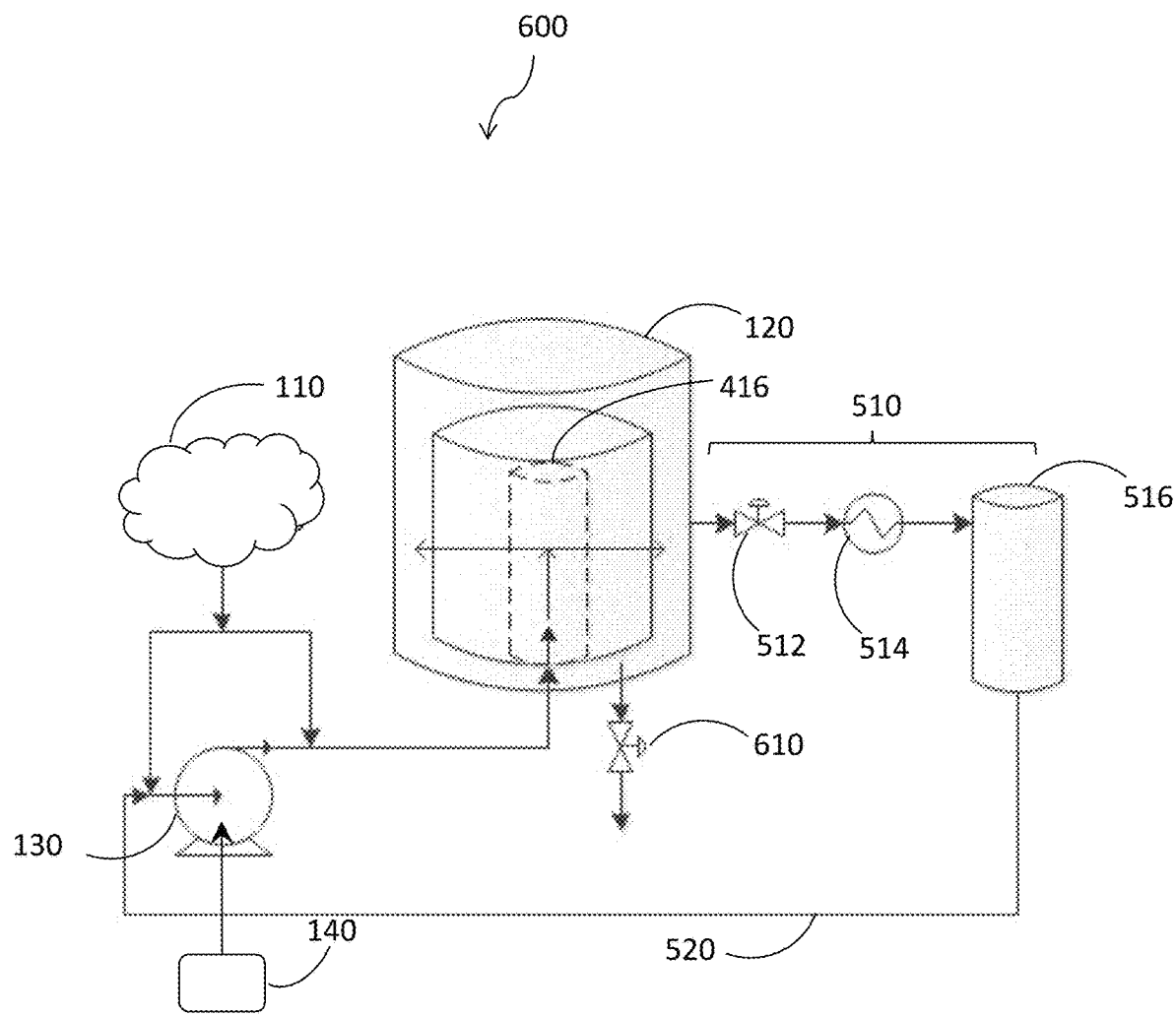
FIG. 6 is an illustration of a method for using oxygen to displace the residual liquor from the fibers in the system of FIG. 4.

FIG. 6 is an illustration of a method 600 for using oxygen gas to displace the residual liquor from the fibers in the method 400 shown in FIG. 4. In method 600, the bleaching liquor 140 is drained from the fiber processing Kier 120 by using a drain valve 610. Then, oxygen gas 110 is injected directly into the center shaft 416 of the basket and diffuses through the fibers in the fiber processing Kier 130.

Figure 7:
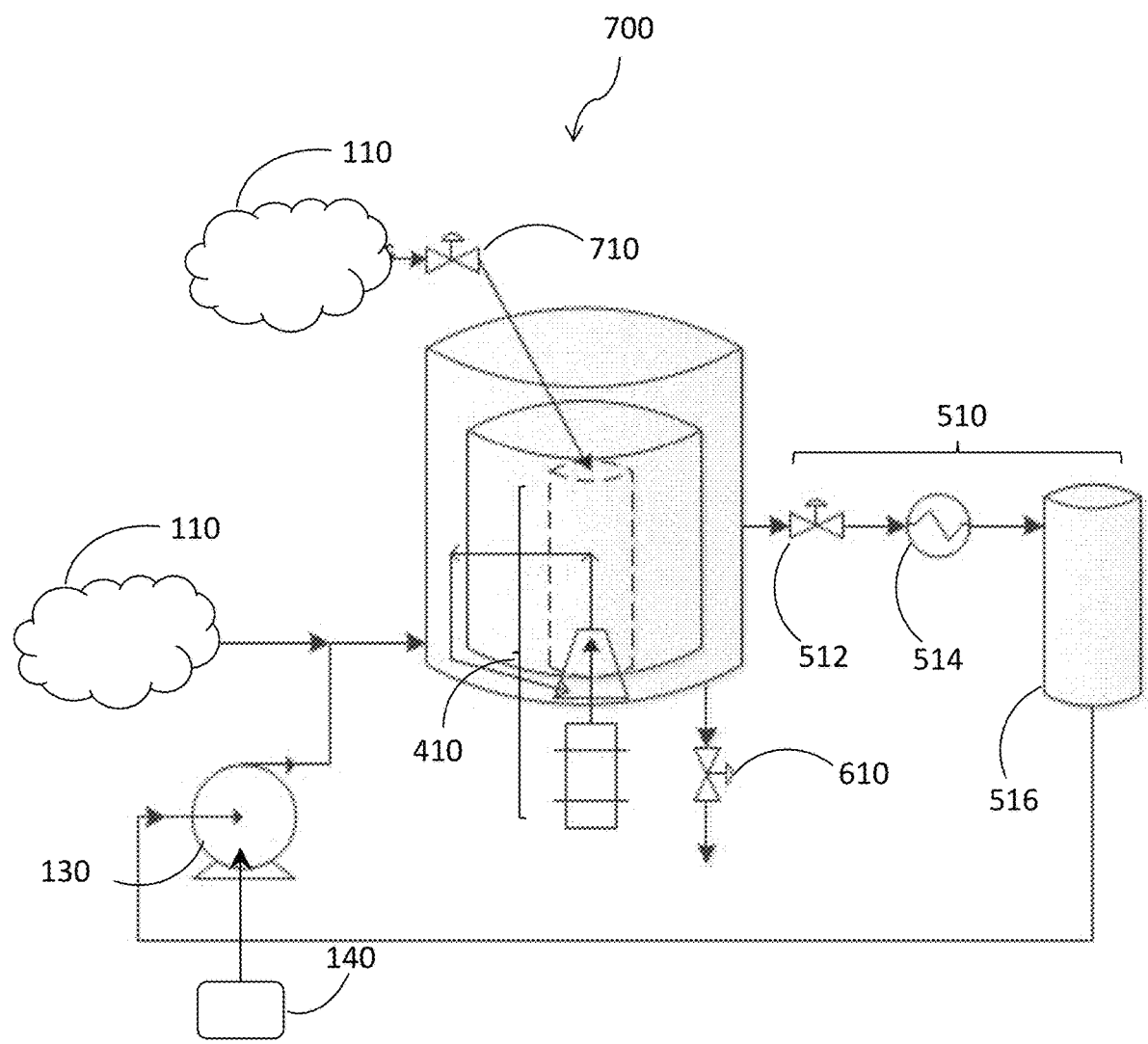
FIG. 7 is an illustration of another method for using oxygen to displace the residual liquor from the fibers in the system of FIG. 4.

FIG. 7 is an illustration of another method 700 for using oxygen gas 110 to displace the residual liquor from the fibers in the method 400 shown in FIG. 4. In method 700, the bleaching liquor 140 is also drained from the fiber processing Kier 120 using a drain valve 610. The fiber processing Kier 120 has an oxygen connection with a check valve 710 at the top of the fiber processing Kier 120, at the bottom of the fiber processing Kier (not shown), or on the liquor circulation pump 130 (not shown). Thus, oxygen can be injected, and vented, into the system using check valve 710.

Figure 8:
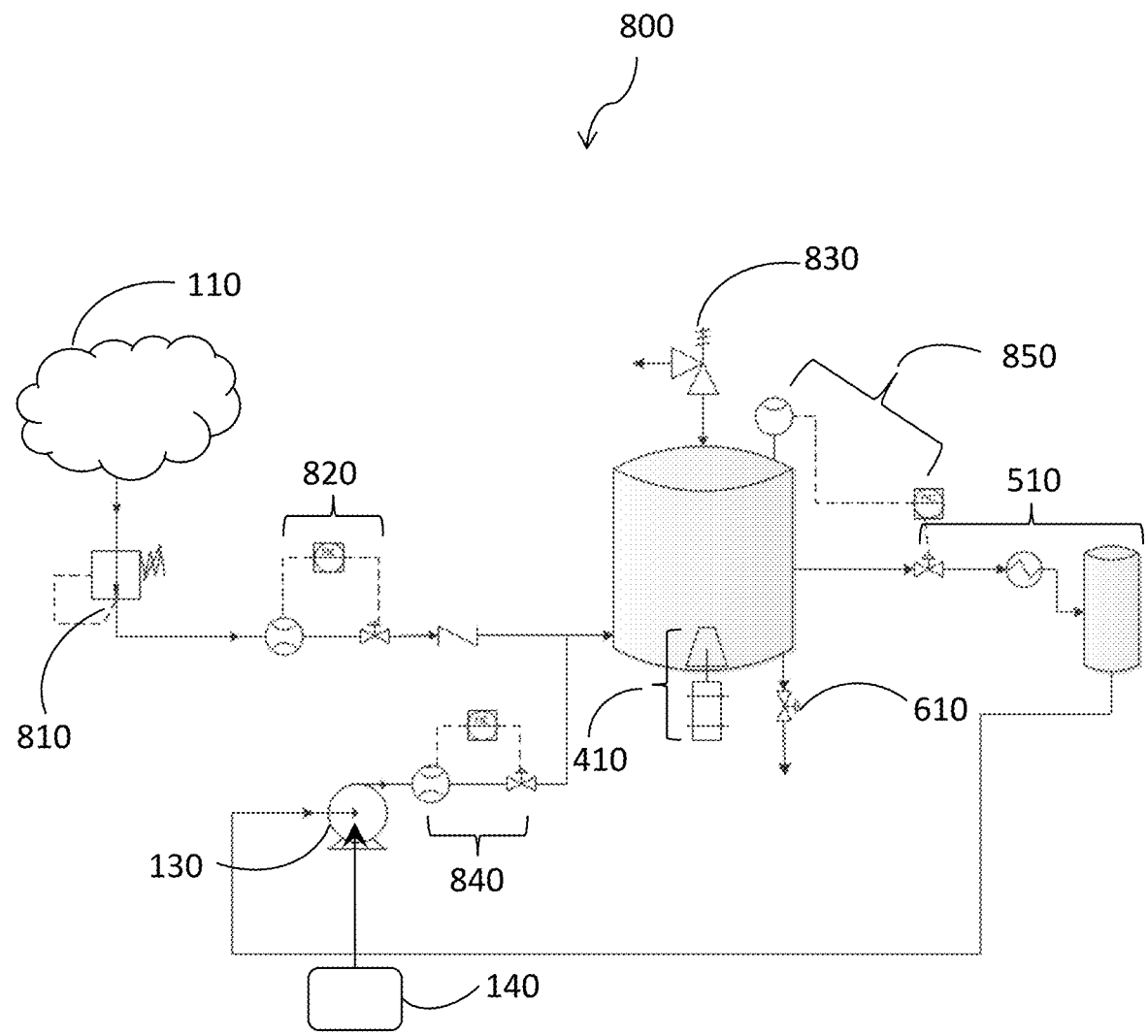
FIG. 8 is an illustration of a control system for oxygen brightening of non-wood fibers.

FIG. 8 is an illustration of a control system 800 for brightening of non-wood fibers in any kier system. The control system 800 has an oxygen tank or other oxygen source for injecting oxygen gas 110. A pressure control device 810 controls the pressure of oxygen gas 110 from the primary source. An oxygen flow control device 820 then controls the flow of oxygen into the system. A liquor flow control device 840 after the liquor circulation pump 130 controls the flow of bleaching liquor 140 into the system. A pressure relief safety valve 830 limits the maximum safe pressure within the fiber processing Kier 120. A Kier pressure control 850 also moderates the pressure within the fiber processing Kier 120.

The scouring process described herein allows for both higher (about 130° C.) and lower temperature processes (about 100° C.). During scouring, the system can be maintained at a temperature in a range between about 95 and about 150° C. In another aspect, the system can be maintained at a temperature in a range between about 110 and about 140° C. during oxygen exposure. Yet, in another aspect, the system can be maintained at a temperature in a range between about 100 and about 130° C. during oxygen gas exposure. Still yet, in another aspect, the system can be maintained at a temperature about or in any range between about 80, 85, 90, 95, 100, 105, 110, 115, 120, 125, 130, 135, 140, 145, and 150° C.

During scouring, the system can be maintained under a pressure in a range between about 1 and about 10 Bar. Maintaining the system under pressure ensures that the oxygen will remain dissolved in solution. In another aspect, the system is maintained under a pressure in a range between about 2 and about 8 Bar. Yet in another aspect, the system is maintained under a pressure in a range between about 3 and about 6 Bar. Still yet, in another aspect, the system is maintained under a pressure about or in any range between about 1, 1.5, 2, 2.5, 3, 3.5, 4, 4.5, 5, 5.5, 6, 6.5, 7, 7.5, 8, 8.5, 9, 9.5, and 10 Bar.

The system is maintained under desired pressure and temperature for a time sufficient to improve the brightness and reduce the shive content of the fibers without damaging the fibers. In one aspect, the fibers are scoured for a time in a range between about 5 and about 180 minutes. In another aspect, the fibers are scoured for a time in a range between about 30 and about 120 minutes. Yet, in another aspect, the fibers are scoured for a time in a range between about 60 and about 180 minutes. Still yet, in another aspect, the fibers are scoured for a time about or in any range between about 5, 15, 30, 45, 60, 75, 90, 105, 120, 135, 150, 175, and 180 minutes.

At the end of the processing time, the system temperature is cooled to below 100° C. (the flash point), and the residual gas is vented. Then, the spent liquor is drained from the system, and the chamber cover is opened. Then rinse water can be added to the fibers and circulated through the fibers with the circulation pump 130. Then the fiber processing kier 120 is drained. The rinse cycle can be repeated with fresh water or buffer as desired. The fiber can then be centrifuged to remove any excess rinse water, and the scoured fibers can be dried, carded, or subjected to additional processing steps, such as bleaching.

The scoured fibers can be subsequently bleached by any methods known in the art, for example peroxide bleaching and/or reductive bleaching. One or more bleaching steps can be performed, for example two peroxide bleaching steps or a peroxide bleaching step and a reductive bleaching step. Reductive bleaching is only effective after the fiber has been treated with oxygen gas. Non-oxygen treated fibers will not be effective to decolorize in a reductive stage.

Peroxide bleaching can include a peroxide compound and an alkaline compound. Non-limiting examples of suitable peroxide compounds include hydrogen peroxide, sodium peroxide, or both hydrogen peroxide and sodium peroxide. Suitable alkaline compounds include, but are not limited to, sodium hydroxide, potassium hydroxide, calcium hydroxide, monoethanolamine, ammonia, or any combination thereof. Alternatively, oxidative bleaching can be performed using other methods, such as those using per-oxy compounds, such as peracetic acid, peroxycarboxylic acids, or per-acids. Enzyme-catalyzed oxidative bleaching methods can also be used.

Reductive bleaching stages can include reducing agents. Non-limiting examples of suitable reducing agents include sodium hydrosulfite, potassium hydrosulfite, sodium sulfite, potassium sulfite, sodium sulfate, potassium sulfate, sodium bisulfite, potassium bisulfite, sodium metasulfite, potassium metasulfite, sodium borohydride, or any combination thereof.

In one aspect, oxygen may be used in a "degumming" process with ammonia, for example, as disclosed in U.S. Pat. No. 7,892,397, which is incorporated herein in its entirety by reference. As disclosed in the '397 Patent, cellulosic fibers are treated with a degumming liquor comprising between about 5% to about 30% (v:v) aqueous ammonia and between about 0.5% to 3% (on OD fiber) hydrogen peroxide, at a temperature between about 50 to about 200° C., at a consistency of about 3:1 to about 20:1 liquor to solids (v/w). The degumming liquor may further comprise 0% to 10% (on OD fiber) of potassium hydroxide and 0% to 0.2% (on OD fibre) of anthraquinone. Addition of oxygen gas in the ammonia-based degumming process may increase fiber brightness and decrease shive content.

The brightened fibers can be used to make nonwoven fabrics and/or textiles according to conventional processes known to those skilled in the art. The nonwoven fabric of the present invention can be incorporated into a variety of textiles and products. Non-limiting examples of products include wipers (or wipes), such as wet wipers, dry wipers, or impregnated wipers, which include personal care wipers, household cleaning wipers, and dusting wipers. Personal care wipers can be impregnated with, e.g., emollients, humectants, fragrances, and the like. Household cleaning wipers or hard surface cleaning wipers can be impregnated with, e.g., surfactants (for example, quaternary amines), peroxides, chlorine, solvents, chelating agents, antimicrobials, fragrances, and the like. Dusting wipers can be impregnated with, e.g., oils.

Non-limiting examples of wipers include baby wipes, cosmetic wipes, perinea wipes, disposable washcloths, household cleaning wipes, such as kitchen wipes, bath wipes, or hard surface wipes, disinfecting and germ removal wipes, specialty cleaning wipes, such as glass wipes, mirror wipes, leather wipes, electronics wipes, lens wipes, and polishing wipes, medical cleaning wipes, disinfecting wipes, and the like. Additional examples of products include sorbents, medical supplies, such as surgical drapes, gowns, and wound care products, personal protective products for industrial applications, such as protective coveralls, sleeve protectors, and the like, protective coverings for automotive applications, and protective coverings for marine applications. The nonwoven fabric can be incorporated into absorbent cores, liners, outer-covers, or other components of personal care articles, such as diapers (baby or adult), training pants, feminine care articles (pads and tampons) and nursing pads. Further, the nonwoven fabric can be incorporated into fluid filtration products, such air filters, water filters, and oil filters, home furnishings, such as furniture backing, thermal and acoustic insulation products, agricultural application products, landscaping application products, and geotextile application products.

A nonwoven web of staple fibers can be formed by a mechanical process known as carding as described in U.S. Pat. No. 797,749, which is incorporated herein in its entirety by reference. The carding process can include an airstream component to randomize the orientation of the staple fibers when they are collected on the forming wire. A state of the art mechanical card, such as the Trützschler-Fliessner EWK-413 card, can run staple fibers having significantly shorter length than the 38 mm noted above. Older card designs may require longer fiber length to achieve good formation and stable operation.

Another common dry web forming process is air-laid or air-forming. This process employs only air flow, gravity, and centripetal force to deposit a stream of fibers onto a moving forming wire that conveys the fiber web to a web bonding process. Air-laid processes are described in U.S. Pat. Nos. 4,014,635 and 4,640,810, both of which are incorporated herein in their entirety by reference. Pulp-based air-formed nonwoven webs frequently incorporate thermoplastic fibers that melt and bond the air-laid web together when the air-formed web is passed through ovens.

Thermal bonding is also referred to as calendar bonding, point bonding, or pattern bonding, can be used to bond a fiber web to form a nonwoven fabric. Thermal bonding can also incorporate a pattern into the fabric. Thermal bonding is described in PCT International Publication No. WO/2005/025865, which is incorporated herein by reference in its entirety. Thermal bonding requires incorporation of thermoplastic fibers into the fiber web. Examples of thermoplastic fibers are discussed above. In thermal bonding, the fiber web is bonded under pressure by passing through heated calendar rolls, which can be embossed with a pattern that transfers to the surface of the fiber web. During thermal bonding, the calendar rolls are heated to a temperature at least between the glass transition temperature ($T_g$) and the melting temperature ($T_m$) of the thermoplastic material.

Brightened fibers are formed into an unbounded web in the wet or dry state. In one aspect, the web is formed by a method employing a mechanical card. In another aspect, the web is formed by a method employing a combination of a mechanical card and a forced air stream. The dry web can be bonded by hydro entangling, or hydroentanglement. In addition, the hydroentangled web can be treated with an aqueous adhesive and exposed to heat to bond and dry the web. Also, the dry web can be bonded by mechanical needle punching and/or passing a heated air stream through the web. Alternatively, the dry web can be bonded by applying an aqueous adhesive to the unbounded web and exposing the web to heat.

Hydroentanglement, also known as spunlacing or spunbonding, to form non-woven fabrics and substrates is well-known in the art. Non-limiting examples of the hydroentangling process are described in Canadian Patent No. 841,938 and U.S. Pat. Nos. 3,485,706 and 5,958,186. U.S. Pat. Nos. 3,485,706 and 5,958,186, respectively, are incorporated herein in their entirety. Hydroentangling involves forming a fiber web, either wet-laid or dry-laid, and thereafter entangling the fibers by employing very fine water jets under high pressure. For example, a plurality of rows of waterjets are directed towards the fiber web which is disposed on a moving support, such as a wire (mesh). Hydroentangling of the fibers provides distinct hydroemboss patterns, which can create low fiber count zones, facilitate water dispersion, and provide a three dimensional structure. The entangled web is then dried.

A nonwoven fiber web of brightened fibers can be wet-laid or foam-formed in the presence of a dispersion agent. The dispersion agent can either be directly added to the fibers in the form of a so-called "fiber finish" or it can be added to the water system in a wet-laying or foam-forming process. The addition of a suitable dispersion agent assists in providing a good formation, i.e, substantially uniform fiber dispersion, of brightened fibers. The dispersion agent can be of many different types which provide a suitable dispersion effect on the brightened fibers or any mixture of such brightened fibers. A non-limiting example of a dispersion agent is a mixture of 75% bis(hydrogenatedtallowaxyl) dimethyl ammonium chloride and 25% propyleneglycol. The addition ought to be within the range of 0.01-0.1 weight %.

During foam-forming the fibers are dispersed in a foamed liquid containing a foam-forming surfactant and water, whereafter the fiber dispersion is dewatered on a support, e.g., a wire (mesh), in the same way as with wet-laying. After the fiber web is formed, the fiber web is subjected to hydroentanglement with an energy flux of about 23,000 foot-pounds per square inch per second or higher. The hydroentanglement is carried out using conventional techniques and with equipment supplied by machine manufacturers. After hydroentanglement, the material is pressed and dried and, optionally, wound onto a roll. The ready material is then converted in a known way to a suitable format and is packed.

The nonwoven fabric described herein can be incorporated into a laminate comprising the nonwoven fabric and a film. Laminates can be used in a wide variety of applications, such outer-covers for personal care products and absorbent articles, for example diapers, training paints, incontinence garments, feminine hygiene products, wound dressings, bandages, and the like.

To form a laminate, an adhesive is applied to a support surface of the nonwoven fabric or a surface of the film. Examples of suitable adhesives include sprayable latex, polyalphaolefin, (commercially available as Rextac 2730 and Rextac 2723 from Huntsman Polymers, Houston, Tex.), and ethylene vinyl acetate. Additional commercially available adhesives include, but are not limited to, those available from Bostik Findley, Inc., Wauwatosa, Wis. Then, a film is fed onto the forming wire on top of the nonwoven fabric. Before application to the nonwoven fabric, the film is stretched as desired. The nonwoven fabric and film are combined and compressed in a nip to form the laminate. Although not required for pressure sensitive adhesives, the nip can be maintained at a desired adhesive bonding temperature suitable for the adhesive employed, e.g. heat activated adhesions. The laminate can be cut, directed to a winder, or directed to further processing.

In addition to applying a film to the nonwoven fabric, another fabric can be bonded to the nonwoven fabric, which can be, for example another nonwoven fabric or a woven fabric. The nonwoven fabric can be a nonwoven fabric made in accordance with the present invention. An adhesive can be applied to either the nonwoven fabric or the other fabric before nipping to form the laminate.

The films used in laminates can include, but are not limited to, polyethylene polymers, polyethylene copolymers, polypropylene polymers, polypropylene copolymers, polyurethane polymers, polyurethane copolymers, styrenebutadiene copolymers, or linear low density polyethylene. Optionally, a breathable film, e.g. a film comprising calcium carbonate, can be employed to form the laminate. Generally, a film is "breathable" if it has a water vapor transmission rate of at least 100 grams/square meter/24 hours, which can be measured, for example, by the test method described in U.S. Pat. No. 5,695,868, which is incorporated herein in its entirety by reference. Breathable films, however, are not limited to films comprising calcium carbonate. Breathable films can include any filler. As used herein, "filler" is meant to include particulates and other forms of materials which will not chemically interfere with or adversely affect the film, but will be substantially uniformly dispersed throughout the film. Generally, fillers are in particulate form and spherical in shape, with average diameters in the range between about 0.1 micrometers to about 7 micrometers. Fillers include, but are not limited to, organic and inorganic fillers.

Optionally, the scouring liquor or the fiber mixture includes additives. Suitable additives include, but are not limited to, chelants, magnesium sulfate, surfactants, wetting agents, pH buffering agents, stabilizing additives, or any combination thereof.

The optional one or more additives can be present in a range between about 0.5 and about 5 wt. % based on the total weight of the mixture of non-wood fibers. In another aspect, one or more additives can be present in a range between about 1 and about 10 wt. %. Yet, in another aspect, one or more additives can be present in a range between about 2 and about 6 wt. %. Still yet, in another aspect, one or additives can be present in a range between about 3 and about 5 wt. %. In one aspect, the mixture of non-wood fibers can include one or more additives about or in any range between about 0.1, 0.2, 0.5, 0.7, 1, 2, 3, 4, 5, 6, 7, 8, 9, 10, 11, 12, 13, 14, 15, 16, 17, 18, 19, and 20 wt. %.

Suitable chelants include any metal sequestrant. Non-limiting examples of chelants include ethylenediamine-N, N'-disuccinic acid (EDDS) or the alkali metal, alkaline earth metal, ammonium, or substituted ammonium salts thereof, or mixtures thereof. Suitable EDDS compounds include the free acid form and the sodium or magnesium salt thereof. Examples of sodium salts of EDDS include $Na_2$EDDS and $Na_4$EDDS. Examples of such magnesium salts of EDDS include MgEDDS and $Mg_2$EDDS. Other chelants include the organic phosphonates, including amino alkylene poly (alkylene phosphonate), alkali metal ethane-1-hydroxy diphosphonates, nitrile-trimethylene phosphonates, ethylene diamine tetra methylene phosphonates, and diethylene triamine penta methylene phosphonates. The phosphonate compounds can be present either in their acid form or as a complex of either an alkali or alkaline metal ion, the molar ratio of the metal ion to phosphonate compound being at least 1:1. Other suitable chelants include amino polycarboxylate chelants such as EDTA.

Suitable wetting agents and/or cleaning agents include, but are not limited to, detergents and nonionic, amphoteric, and anionic surfactants, including amino acid-based surfactants. Amino acid-based surfactant systems, such as those derived from amino acids L-glutamic acid and other natural fatty acids, offer pH compatibility to human skin and good cleansing power, while being relatively safe and providing improved tactile and moisturization properties compared to other anionic surfactants.

Suitable buffering systems include any buffering agents that assist the buffering system in reducing pH changes. Illustrative classes of buffering agents include, but are not limited to, a salt of a Group IA metal including, for example, a bicarbonate salt of a Group IA metal, a carbonate salt of a Group IA metal, an alkaline or alkali earth metal buffering agent, an aluminum buffering agent, a calcium buffering agent, a sodium buffering agent, a magnesium buffering agent, or any combination thereof. Suitable buffering agents include carbonates, phosphates, bicarbonates, citrates, borates, acetates, phthalates, tartrates, succinates of any of the foregoing, for example sodium or potassium phosphate, citrate, borate, acetate, bicarbonate and carbonate, or any combination thereof. Non-limiting examples of suitable buffering agents include aluminum-magnesium hydroxide, aluminum glycinate, calcium acetate, calcium bicarbonate, calcium borate, calcium carbonate, calcium citrate, calcium gluconate, calcium glycerophosphate, calcium hydroxide, calcium lactate, calcium phthalate, calcium phosphate, calcium succinate, calcium tartrate, dibasic sodium phosphate, dipotassium hydrogen phosphate, dipotassium phosphate, disodium hydrogen phosphate, disodium succinate, dry aluminum hydroxide gel, magnesium acetate, magnesium aluminate, magnesium borate, magnesium bicarbonate, magnesium carbonate, magnesium citrate, magnesium gluconate, magnesium hydroxide, magnesium lactate, magnesium metasilicate aluminate, magnesium oxide, magnesium phthalate, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium sesquicarbonate, sodium succinate, sodium tartrate, sodium tripolyphosphate, synthetic hydrotalcite, tetrapotassium pyrophosphate, tetrasodium pyrophosphate, tripotassium phosphate, trisodium phosphate, trometarnol, or any combination thereof.

EXAMPLES

In Examples 1-6, the fiber brightness provided by conventional scouring processes was compared to that provided by the inventive scouring process disclosed herein. In each example, about 100 g dry decorticated fiber was mixed with water and subsequently centrifuged to remove most of the remaining water. The fiber was packed into the stainless steel perforated basket of a fiber processing kier (Colortec Sample Dyeing Machine, commercially available from Roaches International LTD, West Yorkshire, England). The basket was equipped with a central perforated shaft to enable scouring liquor to be circulated radially through the fibers. The top of the basket was covered with a stainless steel plate, and then the basket was placed into the Colortec chamber.

An aqueous liquor of the desired chemicals was prepared and added to the chamber. The liquor was pre-heated to 60-70° C. to accelerate the heat-up cycle. The cover of the chamber was closed, and the circulation pump was started. The liquor was set to circulate from the inside of the basket to the outside of the basket. The system was programmed to heat the liquor to the desired (indicated) treatment temperature and then to hold the system at this temperature for the desired treatment time. Periodically, the liquor flow was reversed for about one minute to minimize any channeling in the fiber.

When using oxygen, the oxygen gas was added at the inlet side of the circulation pump (although it could have been added at any point in the system). The circulation pump aided in dissolving the oxygen charge. Further, the oxygen concentration was controlled by adjusting the partial pressure. The oxygen was vented one or more times to flush air from the system and to ensure the maximum possible dissolved oxygen concentration.

At the end of the processing time, the heater was turned off, the system was cooled to below 100° C. (the flash point), and the residual gas was vented. Then, the spent liquor was drained from the system, and the chamber cover was opened. A water rinse was added to the chamber, and the rinse water was circulated (about 10-20 minutes) and then drained. The rinse cycle was repeated 2 to 4 times with fresh rinse water. The chamber was then drained, opened, and the basket was removed from the machine. The fiber was centrifuged to remove any excess rinse water. The scoured fiber was then dried, carded, or subjected to additional processing steps, such as bleaching.

Comparative Example 1

A sample of flax fiber (Pamplico Decorticated Fax (PDF), commercially available from CRAiLAR Technologies, Inc. (Victoria, B.C, Canada), was scoured under standard conditions (no oxygen or magnesium compounds). Samples of CRAiLAR Treated Pamplico Decorticated Flax (CCPDF1-4) are shown in Table 1, which were run to generate a caustic (NaOH) dose curve with increasing percentages of NaOH. The system was run with a 30 minute retention at 130° C. with 1% on pulp ("OP") of Ultrascour JD (Dacar Chemical Company, Pittsburgh, Pa.), a surfactant/wetting agent, added to the liquor. After scouring, the fiber was rinsed four times at 80° C. Rinses 1, 3, and 4 were with water, and rinse 2 was with a solution of water including 2% OP sodium citrate.

TABLE 1

Comparative fiber scouring

| Sample | NaOH % owf | TAPPI 525 Brightness | L* | a* | b* | CIE Whiteness | Weight loss (%) |
|---|---|---|---|---|---|---|---|
| PDF (blend) | na | 18.5 | 58.4 | 3.4 | 15.3 | −75.5 | n/a |
| CCPDF4 | 7.5 | 25.4 | 63.5 | 2.3 | 11.0 | −36.8 | 21.8 |
| CCPDF1 | 8 | 27.0 | 64.7 | 2.1 | 10.6 | −31.9 | 23.0 |
| CCPDF2 | 10 | 26.1 | 64.1 | 2.2 | 10.8 | −34.7 | 23.1 |
| CCPDF3 | 12 | 26.3 | 64.2 | 2.0 | 10.8 | −34.5 | 23.6 |

As shown in Table 1, the untreated PDF had a TAPPI brightness of 18.5. The scoured fiber samples had a brightness between 25.4 and 27.0, with a yield loss between 21.8 and 23.6%.

Example 2

The next set of samples (Table 2) was run under the inventive scouring conditions (with addition of oxygen gas, magnesium sulfate, and oxygen gas+magnesium sulfate). The oxygen gas was added to the system by the following steps: 1) the system pressure was increased to 2 Bar with oxygen once a temperature of 98° C. was reached; 2) the oxygen pressure was released after 2 minutes; 3) the temperature was maintained at 130° C. once reached; 4) after 15 minutes at 130° C., the system was pressurized to 4 Bar with oxygen (2 Bar partial pressure); and 5) the sample was then maintained under the system conditions for a 15 minute retention time at 130° C.

TABLE 2

Scouring process with oxygen and magnesium sulfate

| | % owf | | | TAPPI 525 | | | | CIE | |
|---|---|---|---|---|---|---|---|---|---|
| Sample | NaOH | MgSO4 | Oxygen | Brightness | L* | a* | b* | Whiteness | Weight loss (%) |
| CCPDF5 | 10 | | Yes | 29.3 | 66.8 | 2.4 | 10.6 | −27.5 | 25.2 |
| CCPDF6 | 10 | 0.5 | Yes | 32.4 | 70.8 | 2.8 | 12.9 | −32.1 | 24.3 |
| CCPDF7 | 10 | 0.5 | Yes | 31.0 | 68.8 | 2.7 | 11.5 | −28.7 | 25.4 |
| CCPDF9 | 10 | 0.5 | No | 25.2 | 63.1 | 2.2 | 10.6 | −35.6 | 23.5 |
| CCPDF 6/7 | 10 | 0.5 | Yes | 33.9 | 71.7 | 2.8 | 12.4 | −27.5 | 24.9 |
| CCPDF2 | 10 | | No | 26.1 | 64.1 | 2.2 | 10.8 | −34.7 | 23.1 |

As shown in Table 2, the oxygen samples demonstrated a significant increase in brightness over the non-oxygen scoured samples. Further, the addition of magnesium to the oxygen scour enhanced the brightness gain compared to oxygen alone. Sample CCPDF9 was run with magnesium sulfate (no oxygen), and did not show a significant improvement over the control (CCPDF2) sample.

Example 3

Table 3 compares the strength, micronair, and trash properties of the scoured fibers in Comparative Example 1 and Example 2. Strength is a tensile measurement and has units of gram/tex. Micronair is a measure of the fiber "fineness." Trash is percent (%) of non-fiber debris (shives and other materials).

TABLE 3

Comparison of fiber physical properties

| | % owf | | | | | |
|---|---|---|---|---|---|---|
| Sample | NaOH | MgSO4 | Oxygen | Strength | micronair | trash |
| PDF | | | | 45.4 | 9.3 | 14.8 |
| AV | | | | 38.4 | 8.9 | 8.6 |

TABLE 3-continued

Comparison of fiber physical properties

| | % owf | | | | | |
|---|---|---|---|---|---|---|
| Sample | NaOH | MgSO4 | Oxygen | Strength | micronair | trash |
| CCPDF1 | 8 | | No | 31.7 | 8.6 | 7.6 |
| CCPDF2 | 10 | | No | 31.5 | 8.4 | 7.4 |
| CCPDF3 | 12 | | No | 31.9 | 8.6 | 8.6 |
| CCPDF4 | 7.5 | | No | 32.3 | 8.5 | 9.0 |
| CCPDF5 | 10 | | Yes | 43.2 | 9.4 | 8.8 |
| CCPDF6 | 10 | 0.5 | Yes | 42.3 | 9.1 | 9.2 |
| CCPDF7 | 10 | 0.5 | Yes | 34.5 | 8.6 | 8.0 |
| CCPDF9 | 10 | 0.5 | No | 37.2 | 9.3 | 10.7 |

Example 4

Table 4 compares brightness after scouring, single stage peroxide bleaching followed by a rinse (stage 1) or a second hydrogen peroxide bleaching stage (stage 2). The residual peroxide ($H_2O_2$) remaining indicates less peroxide is needed to achieve the same brightness. In Table 4, L* is the whiteness, and a* and b* are the colors red-green and blue-yellow, respectively. A* and b* values close to 0 indicate very low color/no color.

TABLE 4

Magnesium hydroxide substitution

| | Alkali % of Total | | | Scour | | | | Peroxide-Stage 1 | | | | Final | H2O2 |
|---|---|---|---|---|---|---|---|---|---|---|---|---|---|
| ID | Mg(OH)2 | NaOH | Oxygen | Brightness | L* | a* | b* | Brightness | L* | a* | b* | pH | Res g/l |
| CPF | | | | 25.9 | 64.3 | 1.3 | 11.5 | | | | | | |
| CPF101 | 0 | 0 | | 24.1 | 61.0 | 1.1 | 8.6 | 39.6 | 78.1 | 0.5 | 15.9 | 9.7 | 0.85 |
| CPF102 | 100 | 0 | | 26.9 | 63.4 | 0.7 | 8.0 | 43.1 | 79.9 | 0.3 | 14.7 | 10.2 | 0.54 |
| CPF103 | 50 | 50 | | 31.7 | 67.6 | 0.5 | 8.1 | 55.6 | 89.1 | −0.2 | 12.0 | 10.9 | 0.17 |
| CPF104 | 25 | 75 | | 32.9 | 68.8 | 0.6 | 8.4 | 56.6 | 86.4 | −0.2 | 11.6 | 11.2 | 0.14 |
| CPF105 | 0 | 100 | | 29.2 | 65.6 | 0.7 | 8.4 | 58.7 | 87.7 | −0.2 | 11.8 | 10.6 | 0.78 |
| CPF201 | 0 | 0 | X | 25.2 | 62.7 | 1.8 | 9.6 | 44.2 | 81.1 | −0.1 | 15.6 | 9.6 | 0.71 |
| CPF202 | 100 | 0 | X | 30.8 | 67.6 | 1.1 | 9.4 | 36.0 | 75.9 | 1.0 | 16.7 | 10.6 | 0.61 |
| CPF203 | 50 | 50 | X | 40.0 | 75.1 | 1.1 | 10.1 | 62.2 | 88.9 | −0.6 | 10.6 | 10.6 | 0.10 |
| CPF204 | 25 | 75 | X | 45.3 | 79.2 | 1.0 | 10.9 | 59.4 | 86.8 | −0.1 | 9.5 | 11.1 | 0.20 |
| CPF205 | 0 | 100 | X | 41.4 | 76.9 | 1.2 | 11.3 | 64.3 | 89.1 | 0.9 | 8.9 | 10.7 | 0.65 |

| | Peroxide-Stage 2 | | | | Final | H2O2 | Brightness Gain | | |
|---|---|---|---|---|---|---|---|---|---|
| ID | Brightness | L* | a* | b* | pH | Res g/l | Scour | P Stage | P/P Stage | Total |
| CPF | | | | | | | | | | |
| CPF101 | 50.94 | 85.03 | −0.37 | 15 | 9.97 | 2 | −1.8 | 15.6 | 11.3 | 25.0 |
| CPF102 | 48.38 | 83.65 | −0.22 | 15.35 | 9.81 | 2 | 1.0 | 16.3 | 5.3 | 22.5 |
| CPF103 | 67.17 | 91.28 | −0.81 | 10.26 | 9.43 | 1.6 | 5.8 | 23.9 | 11.6 | 41.3 |
| CPF104 | 67.32 | 91.13 | −0.91 | 9.87 | 9.59 | 1.7 | 7.0 | 23.8 | 10.7 | 41.4 |
| CPF105 | 69.71 | 92.05 | −0.6 | 9.35 | 9.95 | 1.7 | 3.3 | 29.6 | 11.0 | 43.8 |
| CPF201 | 64.21 | 91.26 | −1.17 | 13 | 10.13 | 2.5 | −0.7 | 19.0 | 20.1 | 38.3 |
| CPF202 | 50.69 | 84.81 | −0.18 | 14.9 | 9.75 | 1.97 | 4.9 | 5.1 | 14.7 | 24.8 |

TABLE 4-continued

| Magnesium hydroxide substitution | | | | | | | | | | |
|---|---|---|---|---|---|---|---|---|---|---|
| CPF203 | 68.05 | 91.63 | −0.64 | 10.08 | | | 14.1 | 22.3 | 5.8 | 42.2 |
| CPF204 | 70.35 | 91.84 | −0.41 | 8.43 | 9.95 | 2 | 19.4 | 14.1 | 11.0 | 44.5 |
| CPF205 | 72.73 | 92.33 | −0.34 | 7.21 | 9.47 | 1.8 | 15.5 | 23.0 | 8.4 | 46.8 |

Each peroxide bleaching stage was performed using a modified "spinner" method. In this method, about 30 g oven dry (OD) fiber was added to a 4 L beaker. Distilled water and the indicated chemicals were added to bring the pulp to about an 8% consistency. The beakers were then placed in a 190° F. water bath about 80% submerged. Instead of continuously agitating the fibers with a motorized spinner, the samples were manually mixed (using a spoon) at approximately 10 minute intervals throughout a 180 minute bleaching duration. A small amount of sodium silicate, 0.2 wt. % on pulp, was also added to the samples to help stabilize hydrogen peroxide.

Experiments were conducted to assess the impact of oxygen gas on the scour process, as well as the interaction between magnesium hydroxide and sodium hydroxide at high substitution rates. In the first set of samples (CPF101-105) (Table 4), a curve for substitution of sodium hydroxide for magnesium hydroxide without oxygen was generated. Samples CPF102-105 were run with a total alkali dose of 10% OP (equal alkali basis. The curve indicated that magnesium hydroxide can be substituted for sodium hydroxide up to about 50% (equal alkali basis) but does not result in significant improvement in brightness (compare brightness results of 25.9 to 31.7).

The second set of samples (FPR202-205) was run with the same chemical doses except with added oxygen gas in the scour (Table 4). The same trend in scour and final peroxide brightness was seen as above, with magnesium substitution up to about 50%. The addition of oxygen gas also resulted in a 1.1 to 12.4 increase in brightness and up to 13.3 points higher in brightness following two-stage peroxide bleach.

provides a significant reduction in alkali required to effectively scour fibers, while at the same time generating a competitive brightness result.

Example 5

Experiments were conducted to assess the impact of adding oxygen gas at the end of the scouring process, after draining the scouring liquor from the kier (in contrast to Examples 1-4 where oxygen gas was introduced into the scour liquor). It was hypothesized that oxygen could be introduced directly into the head space of the kier, which could be done after chemical pectin removal (and with the kier drained of liquor). The oxygen could then permeate the fiber mat and react with the chromophores and shive.

Sample CPF500 was prepared similar to CPF101 in Example 4 and run with only water in the kier (i.e., no alkali addition), and sample CPF505 had 10% sodium hydroxide OP added (Table 4). At the end of the scour process, the kier was drained and oxygen gas was rapidly added to achieve a 4 Bar pressure (about 3 Bar oxygen partial pressure). The oxygen gas was added so that most of the oxygen entered the kier from the inside perforated tube, which resulted in displacement of much of the residual liquor. The oxygen gas was then allowed to react with the fiber for 10 minutes before being vented. During this time, the fiber lost temperature (to approximately 100° C.) due to the loss of circulation heating. The oxygen gas was then vented, and the fiber was rinsed as described above.

TABLE 5

| Oxygen displacement after draining the kier | | | | | | | | | | | | |
|---|---|---|---|---|---|---|---|---|---|---|---|---|
| | | Alkali % of Total | | | Scour | | | | Peroxide-Stage 1 | | | |
| ID | Description | Mg(OH)2 | NaOH | Oxygen | Brightness | L* | a* | b* | Brightness | L* | a* | b* |
| CPF | Start | | | | 25.9 | 64.3 | 1.3 | 11.5 | | | | |
| CPF500 | O2 No Liquor | 0 | 0 | X | 33.3 | 68.9 | 0.5 | 8.0 | 51.2 | 85.2 | −0.4 | 15.0 |
| CPF505 | O2 No Liquor | 0 | 100 | X | 44.1 | 78.8 | 0.9 | 11.5 | 60.5 | 87.9 | −0.3 | 10.3 |
| CPF201 | Water Only | 0 | 0 | X | 25.2 | 62.7 | 1.8 | 9.6 | 44.2 | 81.1 | −0.1 | 15.6 |

| | Final | H2O2 | Peroxide-Stage 2 | | | | Final | H2O2 | Brightness Gain | | |
|---|---|---|---|---|---|---|---|---|---|---|---|
| ID | pH | Res g/l | Brightness | L* | a* | b* | pH | Res g/l | Scour | P Stage | P/P Stage | Total |
| CPF | | | | | | | | | | | | |
| CPF500 | 9.3 | 2.90 | 67.1 | 90.7 | −1.62 | 9.37 | 9.79 | 3.1 | 7.4 | 17.8 | 15.9 | 41.2 |
| CPF505 | 10.0 | 2.80 | 78.51 | 94.46 | −0.7 | 6.27 | 9.76 | 2.6 | 18.2 | 16.4 | 18.0 | 52.6 |
| CPF201 | 9.6 | 0.71 | 64.21 | 91.26 | −1.17 | 13 | 10.13 | 2.5 | −0.7 | 19.0 | 20.1 | 38.3 |

Samples CPF101 and CPF201 were scoured with no alkali addition (only water). Further, CPF101 was run without oxygen and CPF201 was run with oxygen. While the neutral pH (non-alkali) scours did not perform as well as those with alkali, an improvement of over 13 points in final brightness was observed in the sample with oxygen (CPF201) compared to the sample without oxygen (CPF101). This result indicates that addition of oxygen gas As a result of the additional liquor displacement from the oxygen gas, the color of the rinses was noticeably reduced compared to a conventional scour. These results additionally indicate that gas (air or other inert gas) displacement at the end of a scour and/or rinse or bleach stage is beneficial in increasing the efficiency of the subsequent stage. Further, this process reduces the number of rinse stages, the rinse water volume required, and increases the efficiency of the next stage due to the lower carryover of residual chemicals.

Compared to CPF101 (no alkali or oxygen) and CPF201 (no alkali with oxygen), sample CPF500 (also without alkali) had a 9.2 and 8.1 higher brightness after the scour. When oxygen was introduced into the kier after scour, the first stage bleached brightness was 7 points higher than when oxygen introduced into the liquor (CPR201), and the second stage bleached brightness was 2.9 points higher. Further, the significantly higher peroxide residual in both stages reflected higher peroxide bleaching efficiency, which demonstrated utility in reducing the required peroxide dose.

Sample CPF505 achieved a 44.1 scour brightness, which was higher than any of the examples. After two stage peroxide bleaching, CPF505 achieved a 78.5 final brightness. CPF205, with oxygen addition in the liquor during the scour, achieved a final brightness of 72.7, which was 5.8 points lower under similar processing conditions. There also was a significant increase in peroxide residual for both bleaching stages, which again supported the ability to reduce the peroxide charge and chemical cost.

Example 6

A conventionally scoured flax fiber sample was scoured and dried. The sample (BJT) had an untreated brightness of 26.4 (Table 6). The fiber was then soaked at 90° C. to determine the impact of citrate on the subsequent peroxide bleaching stage. A control soak, with water only, demonstrated a 66.5 brightness after standard peroxide bleaching. However, the citrate soaked samples showed improved brightness responses of 71.5 and 71.7 after soaking in tri-sodium citrate or citric acid.

Inventive Flax Scouring Procedures

In the following examples, flax processing (scouring decorticated and cleaned flax fiber) was performed according to the following standard procedure:
1. A sample of flax fiber was weighed out, wetted, and packed into the kier basket
2. The cover was clamped onto the basket, the basket was placed into the kier. The kier was then sealed.
3. The process water was preheated to 50° C., and NaOH, wetting agent (Scourer JD), and sequestering agent (SEQ600) was mixed with the water to form a scouring liquor.
4. The kier was filled with the scouring liquor, and the external, and the internal circulation pumps were started.
5. The temperature was increased at a rate of 3° C. per minute using non-contact steam.
6. Once the temperature reached 130° C., the temperature was held for 45 minutes.
7. The kier was cooled to 90° C. by circulating liquor through a non-contact heat exchanger.
8. The circulation pumps were stopped, and the kier was drained.

One or more rinse cycles were then completed. The rinse procedure steps were as follows:
1. Clean rinse water was heated to 50° C.
2. The kier was filled with the rinse water, and the circulation pumps were started.
3. After about 5 minutes, the pumps were stopped, and the kier was drained.

After rinsing, the fiber could then be bleached. Typically, the fiber remained in the kier for bleaching so that the scour+rinse+bleach+rinse procedure was carried out as a

TABLE 6

Citrate effect on brightness

| Sample | Pre-Treatment | Bleaching | L* | a* | b* | CIE Whiteness | TAPPI Brightness |
|---|---|---|---|---|---|---|---|
| BJT | untreated | untreated | 63.4 | 2.4 | 9.0 | −24.5 | 26.4 |
| BJT-BLK-B9 | deionised water 16 hrs | peroxide bleach 90 C. | 89.7 | −0.2 | 8.4 | 35.8 | 66.5 |
| BJT-CIT-B9 | citric acid 16 hrs | peroxide bleach 90 C. | 91.6 | −0.4 | 7.1 | 46.4 | 71.7 |
| BJT-TSC-B9 | trisodium citrate 16 hrs | peroxide bleach 90 C. | 91.7 | −0.3 | 7.5 | 45.1 | 71.5 |

Example 7

Commercial Flax

For comparison, a sample bleached flax fiber was acquired from Flaxcraft, Inc. (Cresskill, N.J.). The fiber optical properties were determined using the standard test on the MacBeth 3100 instrument. The fiber demonstrated a brightness of 67.44. The properties of the starting flax fiber sample, which is an example of a commercial flax fiber, is shown in Table 7 below for comparison purposes.

TABLE 7

Starting sample of commercial bleached flax fibers

| Sample | L* | a* | b* | Brightness | Whiteness |
|---|---|---|---|---|---|
| SANETOW 24GR | 90.41 | −0.96 | 8.45 | 67.44 | 36.44 | contiguous process. The kier was not opened to remove a small sample of fiber between stages so the process could be monitored.

The standard peroxide bleaching procedure was performed as follows:
1. Clean water was added to the side tank and heated to 50° C. with non-contact steam.
2. NaOH, $H_2O_2$, and a silicate-based stabilizer was added to the water.
3. The circulation pumps were started, and the kier was filled with the bleaching liquor.
4. The temperature was raised by 2-3° C. per minute using non-contact steam.
5. Once the bleaching temperature was achieved, typically 90° C. to 110° C., the temperature was held for 20 to 60 minutes.
6. Optionally, after the initial hold time, the temperature could be increased by 10 to 30° C. for an additional 10 to 30 minutes to complete the brightening reactions.
7. The kier was cooled using non-contact cooling water in a heat exchanger.
8. The circulation pump(s) were stopped, and the kier was drained.
9. 1 to 3 rinses were performed.

10. Optionally, a mild acid, such as acetic acid, was added to the rinse water to reduce the fiber pH to near neutral (about 7).

After the final rinsing, the kier was opened, and the basket was removed. Typically, the basket was placed in a centrifuge and spun for 5 to 20 minutes to remove as much water as possible. The fiber could then be removed from the basket and dried and baled as necessary for the intended end product use.

The first oxygen scour procedure (1) was performed as follows:

1. A sample of flax fiber was weighed out, wetted, and packed into the kier basket.
2. The cover was clamped onto the basket, the basked was placed into the kier. The kier was then sealed.
3. The process water was preheated to 50° C., and NaOH, wetting agent (Scourer JD), and sequestering agent (SEQ600) was mixed with the water to form a scouring liquor.
4. The kier was filled with the scouring liquor, and the external and internal circulation pumps were started.
5. The external circulation valve was closed to seal the kier, and oxygen gas was added to the bottom of the kier so that the gas was drawn into the internal circulation pump.
6. The kier was pressurized to about 4 Bar with oxygen, and additional oxygen was added to maintain 4 Bar of pressure through the heating and temperature hold time. The kier was vented as needed above 100° C. to prevent over pressurization above 4.5 Bar. As steam pressure was produced, the partial pressure of oxygen was allowed to decrease to maintain consistent pressure.
7. The temperature was increased at a rate of 3° C. per minute using non-contact steam.
8. Once the temperature reached 130° C., the temperature was held for 45 minutes.
9. Prior to cooling, the oxygen gas was shut off, and the kier external circulation valve was slowly opened to relieve the oxygen pressure.
10. The kier was cooled to 90° C. by circulating liquor through a non-contact heat exchanger.
11. The circulation pumps were stopped, and the kier was drained. The total time with oxygen present will be specified in the example descriptions below.

The second oxygen procedure (2) was performed as follows:

1. A sample of flax fiber was weighed out, wetted, and packed into the kier basket.
2. The cover was clamped onto the basket, the basked was placed into the kier. The kier was then sealed.
3. The process water was preheated to 50° C., and NaOH, wetting agent (Scourer JD), and sequestering agent (SEQ600) was mixed with the water to form a scouring liquor.
4. The kier was filled with the scouring liquor and the external and internal circulation pumps were started.
5. The external circulation valve was closed to develop a kier pressure of 2-3 Bar, while maintaining a small external circulation of liquor. The circulation rate was about 10% of the wide open flow.
6. Oxygen gas was added to the bottom of the kier so that the gas was drawn into the internal circulation pump.

The gas flow was regulated to maintain a level of dissolved oxygen in the liquor, without allowing excessive un-dissolved oxygen gas bubbles to form and discharge from the kier.

7. The kier pressure was maintained at 2-3 Bar by regulating the oxygen flow and external circulation flow as the temperature was ramped up and held.
8. The temperature was increased at a rate of 3° C. per minute using non-contact steam.
9. Once the temperature reached 130° C., the temperature was held for 45 minutes.
10. Prior to cooling, the oxygen gas was shut off, and the kier external circulation valve was slowly opened to relieve the oxygen pressure.
11. The kier was cooled to 90° C. by circulating liquor through a non-contact heat exchanger.
12. The circulation pumps were stopped, and the kier was drained.

Example 8

A bale of decorticated and cleaned flax was selected to run a series of pilot scale trials. Scouring was performed using this "standard" bale of flax to provide a uniform starting material. The optical properties of the fiber were determined using a Datacolor Spectraflash SF600 Plus-CT reflectance spectrophotometer using ColorTools QC software, D65 illuminant at a 10° observer condition.

TABLE 8

| Optical properties of starting flax fibers | | | | | |
| --- | --- | --- | --- | --- | --- |
| L* | a* | b* | ΔE | CIE Whiteness Index | TAPPI 525 Brightness |
| 57.12 | 2.25 | 12.16 | 0 | −57.81 | 18.86 |

Scouring was performed in a pilot kier system, manufactured by Callebaut De Blicquy S.A. (Brussels, Belgium). The system had a kier capacity of 200 liters and a basket capable of holding 10-20 kg OD fiber. A 12 kg (OD) sample of the starting flax in Table 8 was placed in the kier basket and scoured using the standard (non-oxygen) scouring process described in above in Example 7. The scour was completed using 12% NaOH, 1.0% Scourer JD, and 0.25% SEQ600. After scouring and rinsing, the flax had the following optical properties shown in Table 9:

TABLE 9

| Flax fibers scoured without oxygen | | | | | |
| --- | --- | --- | --- | --- | --- |
| L* | a* | b* | ΔE | CIE Whiteness Index | TAPPI 525 Brightness |
| 60.29 | 1.7 | 8.61 | 5.04 | −28.04 | 23.51 |

Example 9

A 12 kg (OD) sample of the Table 8 starting flax was placed in the kier basket and scoured using the oxygen scour procedure (2) process described above in Example 7. The scour was completed using 12% NaOH, 1.0% Scourer JD, and 0.25% SEQ600. Oxygen addition was started when the kier reached 70° C. and was maintained until the final 5 minutes of retention at 130° C. Based on the oxygen tank weight prior to the start of the scour and the weight after completion of the scour, total oxygen applied was 1.4%. Table 10 provides the optical properties of the fiber after scouring:

TABLE 10

Optical properties after scouring with oxygen scour procedure (2)

| L* | a* | b* | ΔE | CIE Whiteness Index | TAPPI 525 Brightness |
|---|---|---|---|---|---|
| 77.06 | 1.92 | 11.27 | 20.15 | −8.99 | 41.99 |

Example 10

A 12 kg (OD) sample of the Table 8 starting flax was placed in the kier basket and scoured using the oxygen scour procedure (2) process. The scour was completed using 12% NaOH, 1.0% Scourer JD, and 0.25% SEQ600. 0.5% magnesium sulfate was also added to the scour liquor. Oxygen addition was started when the kier reached 70° C. and maintained until the final 5 minutes of retention at 130° C. The optical properties of the fiber after scouring are shown in Table 11 below.

TABLE 11

Optical properties after scouring with oxygen scour procedure (2) and magnesium sulfate

| L* | a* | b* | ΔE | CIE Whiteness Index | TAPPI 525 Brightness |
|---|---|---|---|---|---|
| 73.94 | 1.92 | 11.03 | 17.12 | −14.78 | 37.75 |

Example 11

After scouring in Examples 9 and 10, a small sample of liquor was collected from the kier at intervals and tested for total dissolved solids (TDS) and alkalinity (NaOH g/l). The increase in solids (pectin, lignin, waxes, and other undesirable compounds) in the liquor is an indication of the progression of the scour, as scouring is performed to remove these solids from the fibers.

Figure 9:
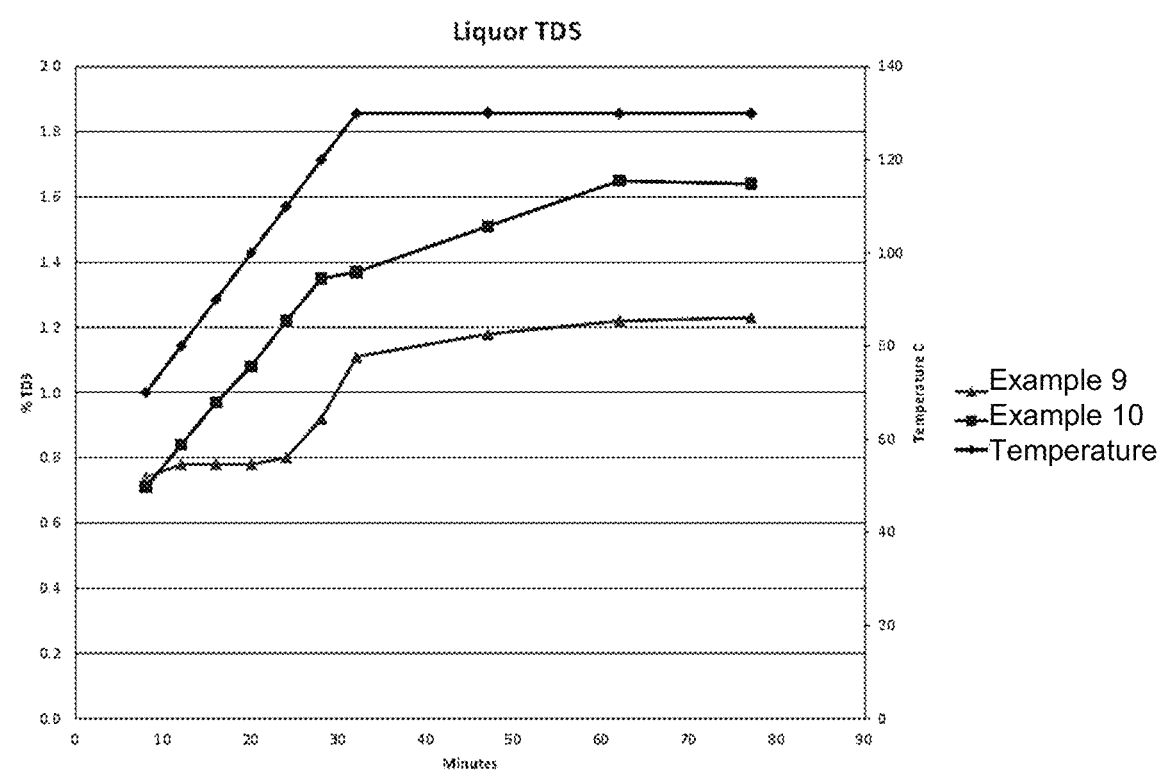
FIG. 9 is a graph of liquor solids as a function of time.

The graph in FIG. 9 shows the increase in liquor solids as a function of the time elapsed, as well as of the temperature of the kier at each sample point for Examples 9 and 10. The standard non-oxygen scour showed very little change in the TDS until a temperature in excess of 110° C. was achieved (Example 8). In contrast, the oxygen reinforced scours in Examples 9 and 10 showed an immediate steep rise in TDS followed by a slower rise above 120° C. (see FIG. 9). The curve also showed a much higher level of extracted materials for the oxygen scour. Oxygen scour achieved a solids level at 20 minutes time and below about 100° C., compared to the traditional scour which required 80 minutes total time, including 45 minutes at 130° C., to achieve the same result.

Figure 10:
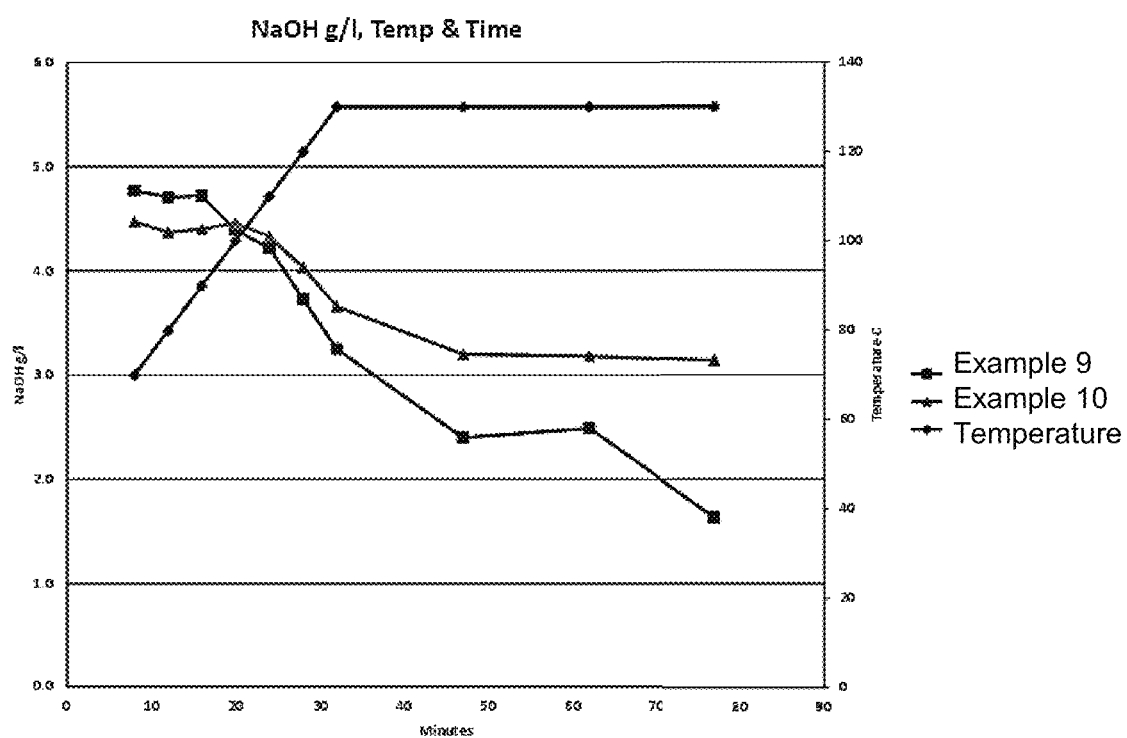
FIG. 10 is a graph of the liquor caustic (NaOH) concentration as a function of time.

The graph in FIG. 10 shows the liquor caustic (NaOH) concentration for Examples 9 and 10. As shown, very little NaOH was consumed for both examples in the initial 15 minutes. After this time, however, the caustic concentration dropped for both examples. Example 9 dropped more sharply, with a much higher amount of caustic being consumed in the scour.

Example 12

A 14 kg (OD) sample of the starting flax of Table 8 was placed in the kier basket and scoured using the standard (non-oxygen) scour procedure. After scouring and rinsing, the flax achieved a 24.84 TAPPI brightness as shown in Table 12 below.

TABLE 12

Flax fibers scoured without oxygen

| L* | a* | b* | ΔE | CIE Whiteness Index | TAPPI 525 Brightness |
|---|---|---|---|---|---|
| 62.62 | 2.08 | 10.47 | 0 | −35.37 | 24.84 |

Example 13

A 14 kg (OD) sample of the starting flax of Table 8 was placed in the kier basket and scoured using the oxygen scour procedure (2) described in Example 7. After scouring and rinsing, the fiber achieved a 27.31 TAPPI brightness as shown in Table 13 below.

TABLE 13

Optical properties after scouring with oxygen scour procedure (2)

| L* | a* | b* | ΔE | CIE Whiteness Index | TAPPI 525 Brightness |
|---|---|---|---|---|---|
| 65.33 | 2.45 | 11.13 | 2.74 | −33.87 | 27.31 |

Example 14

Based on the unexpected acceleration and improvement in the scouring process in the above examples, a low temperature scouring process was developed to take advantage of the utilization of oxygen gas to reduce the energy cost and safety of the scouring process. It is also desirable to avoid heating the fibers to excessive temperatures, as high temperatures tend to damage the fibers and cellulose which results in lower tensile strength and reduced commercial value. In addition, NaOH was added after the oxygen gas was applied to the fibers to avoid any potential alkali darkening.

The third oxygen scour procedure (3) was performed as follows:

1. A sample of flax fiber was weighed out, wetted, and packed into the kier basket.
2. The cover was clamped onto the basket, and the basked placed into the kier. The kier was then sealed.
3. The process water was preheated to 50° C., the kier was filled with the scouring water, and the external and internal circulation pumps were started.
4. The external circulation valve was closed to develop a kier pressure of 2-3 Bar, while maintaining a small external circulation of liquor. The circulation rate was about 10% of the wide open flow.
5. Oxygen gas was added to the bottom of the kier so that the gas was drawn into the internal circulation pump. The gas flow was regulated to maintain a level of dissolved oxygen in the liquor without allowing excessive un-dissolved oxygen gas bubbles to form and discharge from the kier.
6. NaOH, wetting agent (Scourer JD), and sequestering agent (SEQ600) was added to the circulation tank to mix with the water and form a scouring liquor, which was introduced to the kier through the external circulation pump.
7. The temperature was increased at a rate of 3° C. per minute using non-contact steam.
8. The kier pressure was maintained at 2-3 Bar by regulating the oxygen flow and external circulation flow as the temperature was ramped up and held.

9. Once the temperature reached 98-100° C. (just below flash point), the temperature was held for 30-90 minutes.
10. Prior to cooling, the oxygen gas was shut off, and the kier external circulation valve was slowly opened to relieve the oxygen pressure.
11. The kier was cooled to 90° C. by circulating liquor through a non-contact heat exchanger.
12. The circulation pumps were stopped, and the kier was drained.

A 14 kg (OD) sample of the starting flax of Table 8 was placed in the kier basket and scoured using the low temperature oxygen scour procedure (3). After scouring and rinsing, the fiber achieved a 40.94 TAPPI brightness as shown in Table 14.

TABLE 14

Flax fibers scoured with oxygen scour procedure (3)

| L* | a* | b* | ΔE | CIE Whiteness Index | TAPPI 525 Brightness |
|---|---|---|---|---|---|
| 77.02 | 2.32 | 12.7 | 14.48 | −16.69 | 40.94 |

Example 15

A 14 kg (OD) sample of the starting flax of Table 8 was placed in the kier basket and scoured using the low temperature oxygen scour procedure (3). In addition to the specified chemicals, 0.5% OF magnesium sulfate was added to this scour to act as a cellulose protectant and to enhance the scour. After scouring and rinsing the fiber achieved a 38.63 TAPPI brightness as shown in Table 15 below.

TABLE 15

Flax fibers scoured with oxygen scour procedure (3) and magnesium sulfate

| L* | a* | b* | ΔE | CIE Whiteness Index | TAPPI 525 Brightness |
|---|---|---|---|---|---|
| 75.37 | 2.38 | 12.69 | 12.85 | −20.52 | 38.63 |

Example 15

Figure 11:
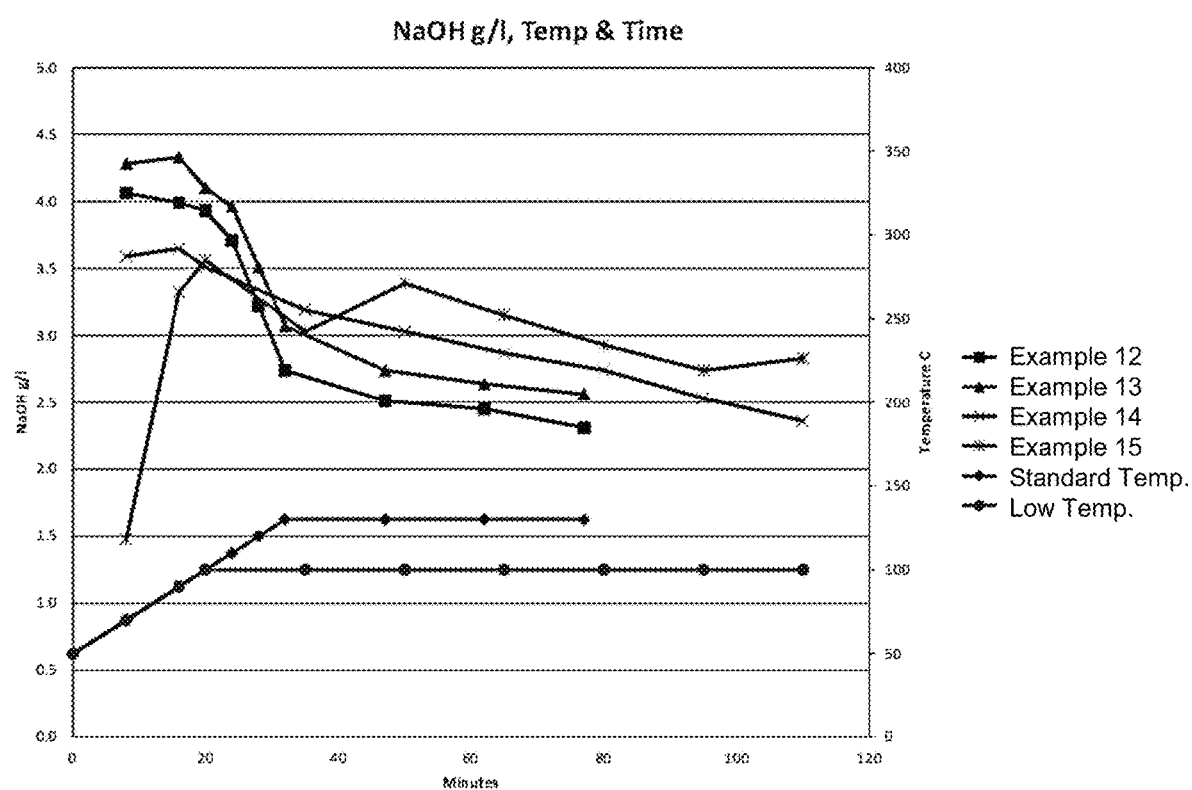
FIG. 11 is a graph of the liquor caustic (NaOH) concentration at different scouring temperatures as a function of time.

FIG. 11 shows a graph of the NaOH concentration in the liquor of Examples 12-15. Note the progression of reduced NaOH consumption going from normal scour (non-oxygen) (Example 12) to normal+oxygen gas (Example 13) to low temperature+oxygen gas (Example 14) to low temperature+oxygen gas+magnesium sulfate (Example 15). Also note the very low NaOH in the first data point (10 minutes) for Example 15, which was the result of sampling before the NaOH had a chance to thoroughly mix with the liquor in the kier.

Example 16

Figure 12:
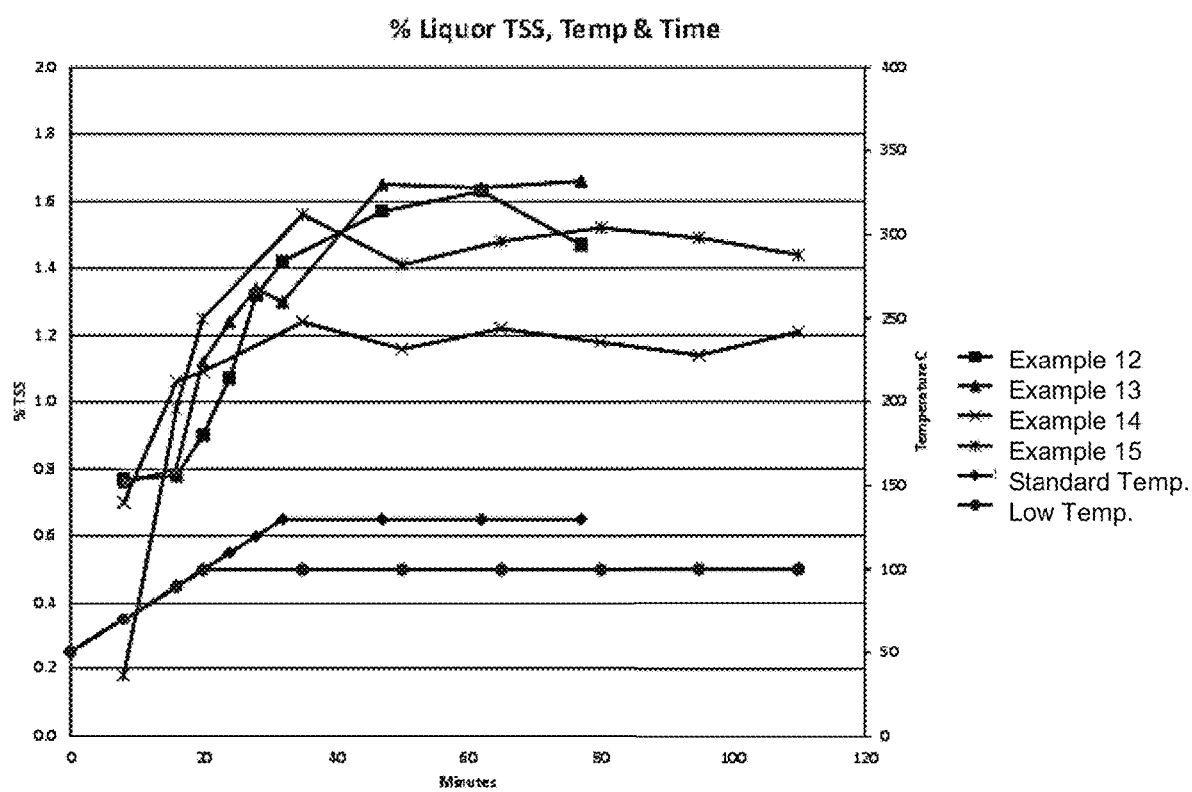
FIG. 12 is a graph of the liquor solids content at different scouring temperatures as a function of time.

FIG. 12 shows the liquor solids content for Examples 12-15, which demonstrate surprising results. The liquor solids curve for the standard scour without oxygen gas (Example 12) shows the same relationship as the oxygen scour (Example 13). However, Example 14, the low temperature oxygen scour, showed a significantly lower liquor solids curve than the higher temperature scours in Examples 12 and 13. However, the scour brightness of 40.94 was significantly higher than either of the high temperature scours. The low temperature oxygen scour with magnesium sulfate in Example 15 demonstrated a very low initial level due to sampling, but showed a solids level higher than Example 14 (but still below the high temperature scours).

Example 17

The scoured flax of Examples 12, 13, 14, and 15 were tested for strength properties. Quite unexpectedly, the oxygen scoured fibers showed significantly higher strength compared to the non-oxygen scoured fibers of Example 12. The low temperature fibers of Examples 14 and 15 had the highest strength of the samples tested. Table 16 provides the high volume instrument (HVI) properties below. The HVI is a cotton testing instrument.

TABLE 16

Strength properties of scoured flax fibers

| Example | HVI Strength g/tex | HVI Length mm | HVI Short Fibre % |
|---|---|---|---|
| Example 12 | 39.9 | 30.6 | 8.2 |
| Example 13 | 42.3 | 31.7 | 4.7 |
| Example 14 | 45.2 | 33.5 | <3.5 |
| Example 15 | 45.2 | 30.0 | 8.5 |

Example 18

The scoured fibers from Examples 12-15 were laboratory bleached with hydrogen peroxide using the modified spinner method. A fixed chemical dose of 4% hydrogen peroxide, 2% sodium hydroxide, 0.1% sodium silicate, and 0.05% DTPA was used for all the samples at a fiber consistency of 5%. Each set of fiber was bleached at both 80° C. and 96° C. to ascertain the impact of bleaching temperature. The data showed a significantly higher brightness for the oxygen scour Examples 13, 14, and 15 (Table 17). The data also showed an unexpected increase in brightness for the low temperature oxygen scour in Examples 14 and 15, compared to the high temperature oxygen scour of Example 12.

TABLE 17

Hydrogen peroxide bleached flax fibers after scouring

| | Peroxide @ 80 C. | | | | Peroxide @ 95 C. | | | |
|---|---|---|---|---|---|---|---|---|
| Example | L* | a* | b* | Brightness | L* | a* | b* | Brightness |
| Example 12 | 84.70 | 0.09 | 13.28 | 52.0 | 87.00 | −0.29 | 13.75 | 50.0 |
| Example 13 | 85.95 | −0.22 | 12.84 | 54.5 | 86.48 | −0.25 | 13.98 | 54.4 |
| Example 14 | 89.00 | −1.06 | 10.97 | 62.0 | 87.38 | −1.05 | 11.72 | 58.2 |
| Example 15 | 87.99 | −0.95 | −0.95 | 60.2 | 87.22 | −1.05 | 12.16 | 57.5 |

Example 19

The peroxide bleached samples of Example 18 were then bleached with a reductive stage to determine the impact of oxygen and temperature on final fiber brightness. The samples were bleached with a 0.5% sodium hydro sulfite dose and at a neutral pH (no pH adjustment). The bleaching was completed using the bag bleaching method with sample preparation and dosing done in a nitrogen atmosphere.

The non-oxygen scour fibers of Example 12 showed only a slight brightness gain in the reductive stage and had final process brightness significantly lower than the oxygen scoured samples, demonstrating the need to activate the fiber to reductive bleaching by an oxygen treatment (Table 18). The low temperature oxygen scoured fibers of Examples 14 and 15 showed a significantly higher brightness than the high temperature oxygen scoured fibers of Example 13.

TABLE 18

Peroxide bleached and reductive stage bleached scoured fibers

| Example | Peroxide @ 80 C. + Hydrosulfite | | | | | Process | Peroxide @ 90 C. + Hydrosulfite | | | | | Process |
|---|---|---|---|---|---|---|---|---|---|---|---|---|
| | L* | a* | b* | Brightness | Y Stage Gain | Total Gain | L* | a* | b* | Brightness | Y Stage Gain | Total Gain |
| Example 12 | 84.85 | −0.28 | 11.84 | 52.4 | 0.4 | 33.5 | 84.14 | −0.75 | 11.51 | 52.8 | 2.8 | 33.9 |
| Example 13 | 87.68 | −0.81 | 11.98 | 61.6 | 7.0 | 42.7 | 87.20 | −0.64 | 10.41 | 59.3 | 4.9 | 40.4 |
| Example 14 | 88.41 | −0.82 | 9.98 | 66.2 | 4.2 | 47.3 | 88.55 | −0.58 | 8.14 | 64.8 | 6.6 | 45.9 |
| Example 15 | 89.49 | −0.92 | 9.48 | 65.6 | 5.4 | 46.7 | 88.66 | −0.57 | 8.14 | 64.4 | 6.9 | 45.5 |

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A method for scouring and increasing the brightness of non-wood fibers, the method comprising:
    forming a mixture of non-wood fibers having a mean length of at least 7 millimeters (mm) into a fiber mat within a perforated basket arranged within a kier;
    exposing the mixture to a scouring liquor and a scouring agent comprising oxygen gas to form a scouring mixture; and
    scouring the scouring mixture in the perforated basket by radially circulating the scouring liquor, by a circulation pump, throughout the mixture to provide scoured fibers.

2. The method of claim 1, wherein scouring is performed at a temperature between about 95 and about 150° C.

3. The method of claim 1, wherein scouring is performed at a temperature less than 110° C.

4. The method of claim 3, wherein the scouring liquor comprises magnesium sulfate.

5. The method of claim 1, further comprising dissolving the oxygen gas in the scouring liquor under a pressure in a range between about 1 and about 10 Bar.

6. The method of claim 1, further comprising cooling the scoured fibers to a temperature below 100° C.

7. The method of claim 1, further comprising draining the scouring liquor from scoured fibers.

8. The method of claim 7, further comprising rinsing the scoured fibers with water and then centrifuging the scoured fibers to remove excess water.

9. The method of claim 1, further comprising introducing a gas into the chamber after scouring to displace residual scouring liquor from the scoured fibers.

10. The method of claim 1, further comprising drying the scoured fibers.

11. The method of claim 1, further comprising internally recirculating the scouring liquor within the kier.

12. The method of claim 11, further comprising externally recirculating the scouring liquor outside the kier.

13. The method of claim 1, wherein the scouring liquor comprises magnesium sulfate.

14. The method of claim 1, wherein the scouring liquor comprises sodium hydroxide.

15. The method of claim 1, further comprising exposing the non-wood fibers to an organic acid.

16. The method of claim 15, wherein the organic acid is acetic acid, citric acid, formic acid, lactic acid, oxalic acid, uric acid, or any salt thereof.

17. The method of claim 16, where in the salt of citric acid is trisodium citrate, calcium citrate, or both trisodium citrate and calcium citrate.

18. The method of claim 1, wherein the non-wood fibers are bast fibers.

19. The method of claim 1, wherein the non-wood fibers are flax fibers, hemp fibers, jute fibers, ramie fibers, nettle fibers, Spanish broom fibers, kenaf plant fibers, or any combination thereof.

20. The method of claim 1, wherein the non-wood fibers are cotton fibers.

21. The method of claim 1, wherein the scouring liquor has a pH in a range between about 6 and about 8.

22. The method of claim 1, wherein the scouring liquor has a pH in a range between about 7 and about 12.

23. The method of claim 1, further comprising carding the scoured fibers.

24. The method of claim 1, further comprising hydroentangling the scoured fibers.

25. A method for increasing the brightness of non-wood fibers, the method comprising:
    forming a mixture of non-wood fibers having a mean length of at least 7 millimeters (mm) into a fiber mat within a perforated basket arranged within a kier; and
    scouring the mixture in the perforated basket with a scouring liquor comprising oxygen gas to provide scoured and brightened fibers, the scouring comprising radially circulating and recirculating the scouring liquor through the mixture using a circulation pump;
    wherein the scoured and brightened fibers have a brightness in a range between about 30 and about 60 as measured by Technical Association of the Pulp and Paper Industry (TAPPI) 525 standard test method.

26. The method of claim 25, wherein scouring is performed at a temperature less than 110° C.

27. The method of claim 25, wherein the scouring liquor comprises magnesium sulfate.

28. The method of claim 25, further comprising draining the scouring liquor from scoured fibers.

29. The method of claim 28, further comprising rinsing the scoured fibers with water and then centrifuging the scoured fibers to remove excess water.

30. The method of claim 29, further comprising introducing a gas after scouring to displace residual scouring liquor from the scoured fibers.

31. The method of claim 25, further comprising drying the scoured fibers.

32. The method of claim 25, wherein the scouring liquor comprises magnesium sulfate.

33. The method of claim 25, further comprising exposing the non-wood fibers to an organic acid.

34. The method of claim 33, wherein the organic acid is acetic acid, citric acid, formic acid, lactic acid, oxalic acid, uric acid, or any salt thereof.

35. The method of claim 34, where in the salt of citric acid is trisodium citrate, calcium citrate, or both trisodium citrate and calcium citrate.

36. The method of claim 25, wherein the non-wood fibers are bast fibers.

37. The method of claim 25, wherein the non-wood fibers are flax fibers, hemp fibers, jute fibers, ramie fibers, nettle fibers, Spanish broom fibers, kenaf plant fibers, or any combination thereof.

38. The method of claim 25, wherein the non-wood fibers are cotton fibers.

39. The method of claim 25, further comprising bleaching the scoured and brightened fibers to provide bleached fibers.

40. The method of claim 39, wherein bleaching comprises exposing the scoured and brightened fibers to a peroxide compound, oxygen gas, a reducing agent, or a combination thereof.

41. The method of claim 39, further comprising exposing the bleached fibers to a second bleaching stage.

42. The method of claim 41, wherein the second bleaching stage comprises exposing the bleached fibers to a peroxide compound, oxygen gas, a reducing agent, or a combination thereof.

43. A method of reducing the amount of residual shive in non-wood fibers, the method comprising:
  forming a mixture of non-wood fibers having a mean length of at least 7 millimeters (mm) into a fiber mat within a perforated basket within a kier; and
  scouring the mixture in the perforated basket with a scouring liquor comprising oxygen gas to provide scoured and low-shive fibers, the scouring comprising radially circulating the scouring liquor through the mixture using a circulation pump;
  wherein the scoured and low-shive fibers have less visible shive content than the fibers of the mixture before exposure.

44. The method of claim 43, wherein the structural integrity of the residual shive is reduced during scouring.

45. The method of claim 43, wherein scouring is performed at a temperature between about 95 and about 150° C.

46. The method of claim 43, wherein scouring is performed at a temperature less than 110° C.

47. The method of claim 46, wherein the scouring liquor comprises magnesium sulfate.

48. The method of claim 43, further comprising dissolving the oxygen gas in the scouring liquor under a pressure in a range between about 1 and about 10 Bar.

49. The method of claim 43, further comprising cooling the scoured fibers to a temperature below 100° C.

50. The method of claim 43, further comprising draining the scouring liquor from scoured fibers.

51. The method of claim 50, further comprising rinsing the scoured fibers with water and then centrifuging the scoured fibers to remove excess water.

52. The method of claim 43, further comprising introducing a gas into the chamber after scouring to displace residual scouring liquor from the scoured fibers.

53. The method of claim 43, further comprising drying the scoured fibers.

54. The method of claim 43, wherein the scouring liquor comprises magnesium sulfate.

55. The method of claim 43, wherein the scouring liquor comprises sodium hydroxide.

56. The method of claim 43, further comprising exposing the non-wood fibers to an organic acid.

57. The method of claim 56, wherein the organic acid is acetic acid, citric acid, formic acid, lactic acid, oxalic acid, uric acid, or any salt thereof.

58. The method of claim 43, wherein the non-wood fibers are bast fibers.

59. The method of claim 43, wherein the non-wood fibers are flax fibers, hemp fibers, jute fibers, ramie fibers, nettle fibers, Spanish broom fibers, kenaf plant fibers, or any combination thereof.

60. The method of claim 43, wherein the non-wood fibers are cotton fibers.

* * * * *